United States Patent
Tseng et al.

(10) Patent No.: US 10,942,422 B2
(45) Date of Patent: Mar. 9, 2021

(54) CAMERA MODULE AND ELECTRONIC DEVICE

(71) Applicant: LARGAN DIGITAL CO., LTD., Taichung (TW)

(72) Inventors: Te-Sheng Tseng, Taichung (TW); Ming-Ta Chou, Taichung (TW); Wen-Hung Hsu, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

(21) Appl. No.: 16/459,781

(22) Filed: Jul. 2, 2019

(65) Prior Publication Data
US 2020/0081321 A1     Mar. 12, 2020

(30) Foreign Application Priority Data

Sep. 12, 2018 (TW) .................... 10713211.9

(51) Int. Cl.
*G03B 13/36* (2006.01)
*G03B 17/17* (2006.01)
*G02B 13/00* (2006.01)

(52) U.S. Cl.
CPC .......... *G03B 13/36* (2013.01); *G02B 13/007* (2013.01); *G03B 17/17* (2013.01)

(58) Field of Classification Search
USPC ....................................................... 396/133
See application file for complete search history.

(56) References Cited

U.S. PATENT DOCUMENTS

| | | | | |
|---|---|---|---|---|
| 7,983,545 | B2 * | 7/2011 | Maeda | G03B 17/00 348/208.11 |
| 8,629,388 | B2 * | 1/2014 | Yu | H01L 31/02325 250/208.1 |
| 9,019,637 | B2 | 4/2015 | Tsai | |
| 9,285,566 | B2 * | 3/2016 | Chan | G02B 13/009 |
| 9,316,810 | B2 * | 4/2016 | Mercado | G02B 13/004 |
| 9,557,627 | B2 * | 1/2017 | Mercado | G03B 13/32 |
| 2008/0169891 | A1 * | 7/2008 | Umeda | G02B 7/003 335/229 |

(Continued)

FOREIGN PATENT DOCUMENTS

| | | |
|---|---|---|
| JP | H08194146 A | 7/1996 |
| TW | M509915 U | 10/2015 |

*Primary Examiner* — Clayton E. LaBalle
*Assistant Examiner* — Warren K Fenwick
(74) *Attorney, Agent, or Firm* — McClure, Qualey & Rodack, LLP

(57) ABSTRACT

A camera module includes a plastic carrier, an imaging lens assembly, a reflective element and a plurality of auto-focusing elements. The plastic carrier includes an inner portion and an outer portion, wherein an inner space is defined by the inner portion, and the outer portion includes at least one mounting structure. The imaging lens assembly is disposed in the inner space of the plastic carrier. The reflective element is for folding an image light by a reflective surface of the reflective element into the imaging lens assembly. The auto-focusing elements include at least two magnets and at least one wiring element, wherein the auto-focusing elements are for moving the plastic carrier along a second optical axis of the imaging lens assembly, and the magnets or the wiring element can be disposed on the mounting structure of the outer portion.

21 Claims, 25 Drawing Sheets

(56) References Cited

U.S. PATENT DOCUMENTS

| | | |
|---|---|---|
| 2017/0023764 A1 | 1/2017 | Chou |
| 2017/0146771 A1 | 5/2017 | Ho et al. |
| 2017/0235093 A1 | 8/2017 | Sekiguchi |
| 2017/0299839 A1 | 10/2017 | Weng et al. |
| 2017/0329151 A1 | 11/2017 | Hu et al. |
| 2018/0024329 A1* | 1/2018 | Goldenberg ............. G02B 7/08 359/557 |
| 2019/0146238 A1* | 5/2019 | Chan ................... G02B 13/009 348/208.1 |

* cited by examiner

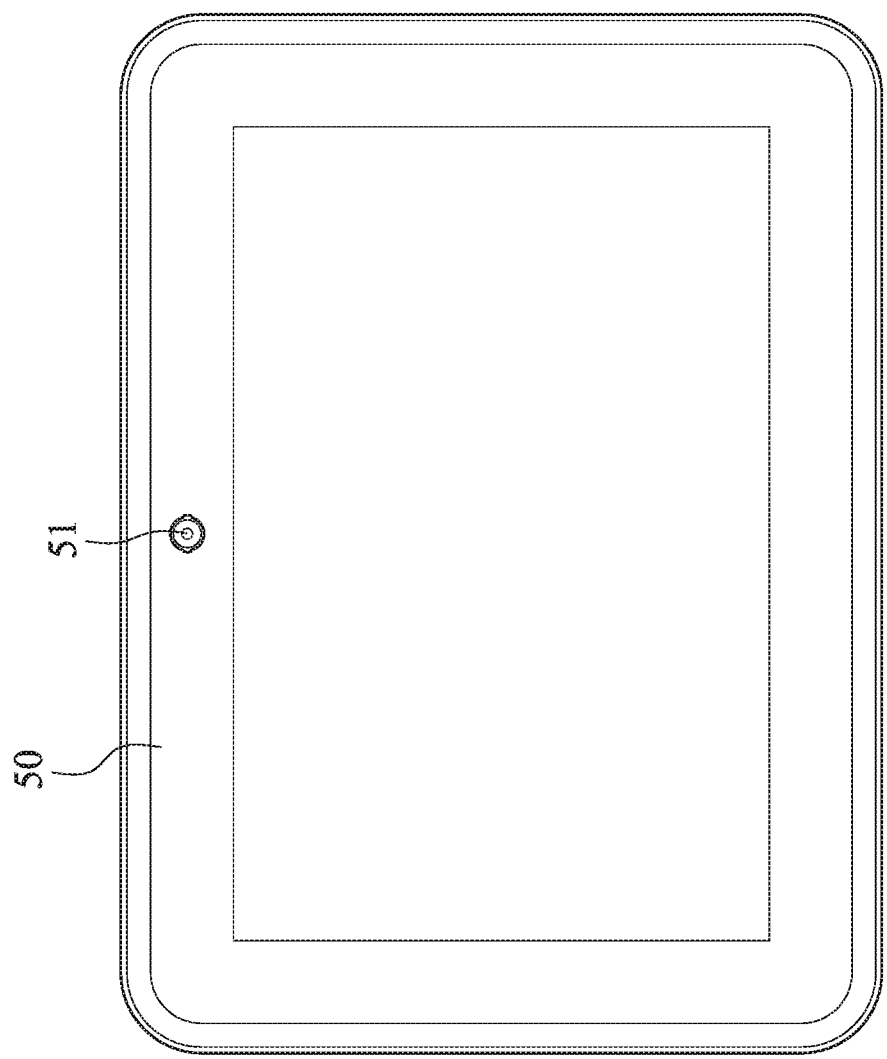

CAMERA MODULE AND ELECTRONIC DEVICE

RELATED APPLICATIONS

This application claims priority to Taiwan Application Serial Number 107132119, filed Sep. 12, 2018, which is herein incorporated by reference.

BACKGROUND

Technical Field

The present disclosure relates to a camera module. More particularly, the present disclosure relates to a camera module applicable to a portable electronic device.

Description of Related Art

In recent years, the portable electronic devices have been developed rapidly, such as smart devices, tablets and so on. These portable electronic devices have been full of daily lives of modern people, and the camera module loaded on the portable electronic devices thrives on it. The demand for quality of the camera module increases along with the advances in technology. Therefore, the camera module needs to be improved not only on the quality of the optical design but manufacturing assembling precision.

During the process of the manufacturing and assembly of the camera module, the arrangement among the elements not only would affect size and image quality thereof, but also restrict the range of the applications on portable electronic devices. Therefore, development of camera module with both compact size and high image quality is a goal of the related industries.

SUMMARY

According to one aspect of the present disclosure, a camera module includes a plastic carrier, an imaging lens assembly, a reflective element, and a plurality of auto-focusing elements. The plastic carrier includes an inner portion and an outer portion. The inner space is defined by the inner portion, and the inner portion includes, from an object side to an image side, an object-side opening, at least one inner annular surface and an image-side opening. The outer portion includes at least one mounting structure. The imaging lens assembly is disposed in the inner space of the plastic carrier, and includes a plurality of lens elements and a second optical axis. The reflective element is for folding an image light by a reflective surface of the reflective element into the imaging lens assembly, wherein the reflective element includes a first optical axis, and the first optical axis is folded into the second optical axis via the reflective surface. The auto-focusing elements include at least two magnets and at least one wiring element, wherein the auto-focusing elements are for moving the plastic carrier along the second optical axis of the imaging lens assembly, and the at least two magnets or the at least one wiring element is mounted on the at least one mounting structure of the outer portion. The object-side opening is closer to the reflective element than the image-side opening thereto, the at least two magnets are respectively disposed on two sides of one plane formed by the first optical axis and the second optical axis.

According to another aspect of the present disclosure, an electronic device includes the camera module of the afore- mentioned aspect and an image sensor, wherein the image sensor is disposed on an image surface of the camera module.

BRIEF DESCRIPTION OF THE DRAWINGS

The present disclosure can be more fully understood by reading the following detailed description of the embodiment, with reference made to the accompanying drawings as follows:

FIG. 5 is a schematic view of an electronic device according to the 5th embodiment of the present disclosure.

DETAILED DESCRIPTION

Figure 1A:
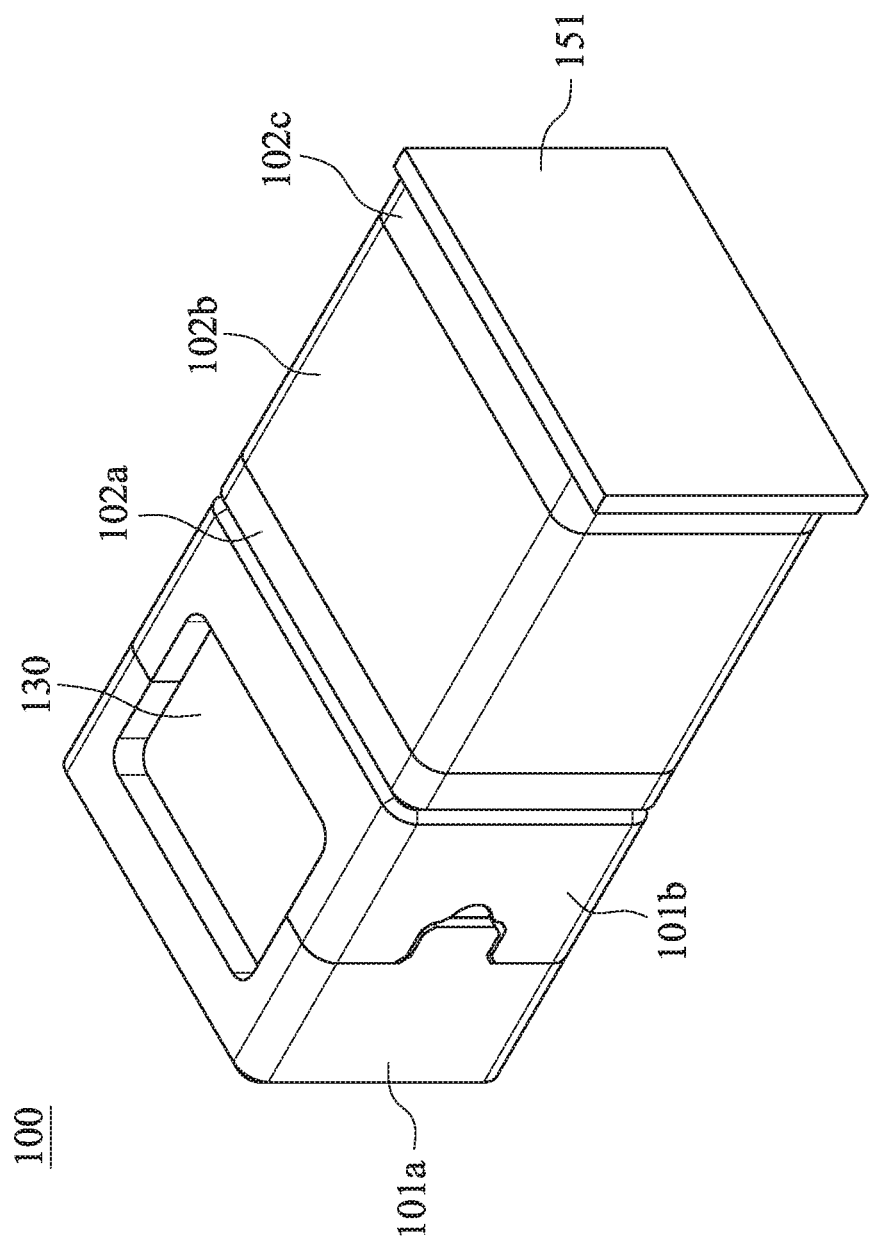
FIG. 1A is a three-dimensional view of a camera module according to the 1st embodiment of the present disclosure.

The present disclosure provides a camera module, including a plastic carrier, an imaging lens assembly, a reflective element, and a plurality of auto-focusing elements. The plastic carrier includes an inner portion and an outer portion, wherein the inner space is defined by the inner portion, and the inner portion includes, from an object side to an image side, an object-side opening, at least one inner annular surface and an image-side opening. The outer portion includes at least one mounting structure. The imaging lens assembly is disposed in the inner space of the plastic carrier, and includes a plurality of lens elements and a second optical axis. The reflective element is for folding an image light by a reflective surface of the reflective element into the imaging lens assembly, wherein the reflective element includes a first optical axis, and the first optical axis is folded into the second optical axis via the reflective surface. The auto-focusing elements include at least two magnets and at least one wiring element, wherein the auto-focusing elements are for moving the plastic carrier along the second optical axis of the imaging lens assembly, and the at least two magnets or the at least one wiring element is mounted on the at least one mounting structure of the outer portion. The object-side opening is closer to the reflective element than the image-side opening thereto, the at least two magnets are respectively disposed on two sides of one plane formed by the first optical axis and the second optical axis. More specifically, the at least two magnets and the plastic carrier are arranged in a direction vertical to the second optical axis, and the plastic carrier is located between the at least two magnets. Therefore, it is favorable for reducing the height of the camera module so as to achieve a miniaturized design by equally disposing the at least two magnets with driving function on two sides of the plane formed by the integrated plastic carrier and the reflective element.

The inner portion of the plastic carrier and the mounting structure of the outer portion can be integrally formed into a black plastic article via an injection molding. Therefore, it is favorable for enhancing the manufacturing quality effectively by replacing the tolerances generated by the assembling of different parts with the manufacturing precision of the mold.

The wiring element can be disposed on the plastic carrier and face towards the magnets. Therefore, it is favorable for achieving the function of auto-focusing actuation by cooperating the circuit mating elements to the wiring element and the magnets without additional mounting mechanical element.

The aforementioned at least two magnets can be disposed on the plastic carrier and face towards the wiring element. Therefore, it is favorable for reducing the thickness of the camera module effectively by simplifying the arrangement of the magnets so as to achieve the goal of miniaturization.

One of the lens elements of the imaging lens assembly closest to the reflective element is exposed out of the plastic carrier along a direction vertical to the second optical axis; that is, the lens element closest to the reflective element is not covered by the plastic carrier along the direction vertical to the second optical axis. Therefore, the aforementioned lens element can be the last lens element of the imaging lens assembly assembled into the plastic carrier, which is favorable for adaptively rotating the lens element by the assembling fixture when the lens element is assembled, so that the resolution of the imaging lens assembly can be improved, and it is favorable for reducing the undesirable image quality by adjusting the lens element during the assembling process in the simple assembling.

The imaging lens assembly can further include a retaining ring disposed in the plastic carrier and close to the object-side opening, so as to locate the lens element in the inner space. In the present disclosure, the plastic carrier can be integrally formed by a carrier and a lens barrel, the arrangement of the retaining ring can stabilize the assembly of the imaging lens assembly so as to enhance the quality reliability of the camera module, and it is favorable for the imaging lens assembly preventing from unnecessary effect by external force.

When a height of the plastic carrier is H, and an outer diameter of the retaining ring is $\psi L$, the following condition is satisfied: $0.3 < \psi L/H < 1.0$. Therefore, the retaining ring can have better structural strength so as to avoid the excessive outer diameter which causes the retaining ring damaged easily. Furthermore, the following condition can be satisfied: $0.4 < \psi L/H < 0.85$. Therefore, the stable effect provided by the retaining ring can be further enhanced.

The aforementioned auto-focusing elements can further include a first sheet elastic element and a second sheet elastic element, wherein the first sheet elastic element and the second sheet elastic element are arranged along the second optical axis in pairs. Therefore, it is favorable for reducing the size of the camera module effectively, and enhancing the manufacturing efficiency.

A number of the inner annular surface is at least three. Therefore, more lens element can be accommodated to achieve different levels of resolution requirements.

When a half of a maximum field of view of the imaging lens assembly is HFOV, the following condition is satisfied: 0 degrees<HFOV<20 degrees. Therefore, a smaller half of field of view is favorable for meeting the requirements of different shooting distances.

The reflective element can be a prism element and a number of the reflective element is only one, which is for folding the image light into the imaging lens assembly thereby. It is favorable for checking the image quality of the imaging lens assembly by arranging the prism element on the front end of the imaging lens assembly. After ensuring the resolution meeting the standard, the prism element can be assembled and adjusted to align the image capturing range of the camera module so as to improve an efficiency of the production process.

One of the lens elements of the imaging lens assembly closest to the prism element is a first lens element, and a central thickness of the first lens element is a largest central thickness among central thicknesses of the lens elements of the imaging lens assembly. Therefore, it is favorable for ensuring the imaging lens assembly with sufficient light refractive power so as to maintain more adjustment margin adapting to requirements of optical specifications.

One of the lens elements of the imaging lens assembly closest to the prism element is a first lens element, when a distance between an object-side surface of the first lens element and an image surface on the second optical axis is TTL, and a focal length of the imaging lens assembly is f, the following condition is satisfied: $0.4 < TTL/f < 1.10$. Thereby, the photographing requirements with enlarging effect can be satisfied.

All of the lens elements of the imaging lens assembly are located in the inner space of the plastic carrier. Since the focus of the camera module is performed by the entire imaging lens assembly, it is favorable for avoiding the difference of the moving distances of the lens elements which might cause the undesirable image result from tilting lens element by disposing all lens elements in the inner space.

The plastic carrier can further include at least two gate traces respectively disposed on the two sides of the plane formed by the first optical axis and the second optical axis. Therefore, it is favorable for molding the plastic carrier with further complicated structure by arranging the injecting position on different sides.

The aforementioned at least two gate traces are both close to the image-side opening; that is, the distance between each gate trace and the object-side opening is greater than the distance between each gate trace and the image-side opening. Therefore, it is favorable for enhancing the molding quality of the image-side opening, so as to avoid flaws the image-side opening from the injection molding, such as a short-bright surface flaw, which would further affect the image quality and generate a stray light.

A diameter of the image-side opening can be smaller than outer diameters of all of the lens elements of the imaging lens assembly. Therefore, the plastic carrier can be deemed as the lens barrel for the imaging lens assembly to be disposed therein, and an additional lens barrel can be omitted, so as to reduce the size of the camera module.

A number of the wiring element can be only one, and the wiring element can surround the outer portion of the plastic carrier. By reducing the number and a complexity of the wiring element, assembling steps can be reduced and manufacturing fluency can be improved.

The number of the at least two magnets can be an even. Therefore, the size of the camera module can be avoided to be modified due to the number of the magnets, and it is favorable for moving the plastic carrier by the auto-focusing elements further stably.

The plastic carrier can be a threadless structure. Therefore, a tolerance and a difficulty of assembling can be reduced to increase a qualifying rate of the image quality of the camera module.

Furthermore, a material of the plastic carrier can include a chemical fiber or a glass fiber, such as PC with 30% glass fiber. Therefore, a flow of plastic bodies inside the molding die can be increased, and a surface molding quality of the plastic bodies can be better. For example, chemical fiber can strengthen the structural strength of the plastic carrier. Thus, it is favorable for the production control and quality of injection molding by doping a proper amount of fiber material.

Each of the aforementioned features of the camera module can be utilized in various combinations for achieving the corresponding effects.

The present disclosure further provides an electronic device, including the aforementioned camera module and an image sensor, wherein the image sensor is disposed on an image surface of the camera module. Therefore, the electronic device with both image quality and assembling stability can be provided.

1st Embodiment

Figure 1B:
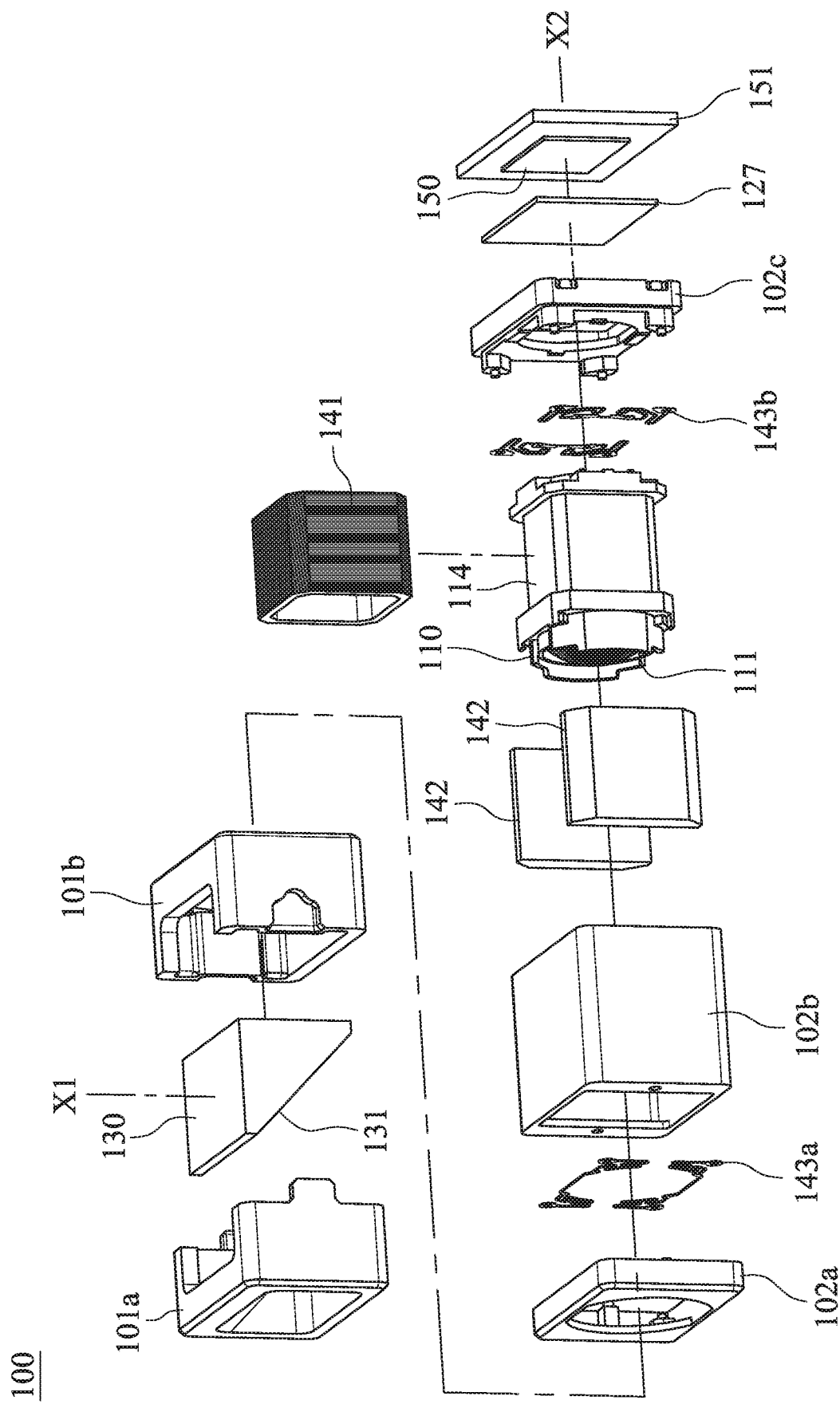
FIG. 1B is an exploded view of the camera module according to the 1st embodiment in FIG. 1A.
Figure 1C:
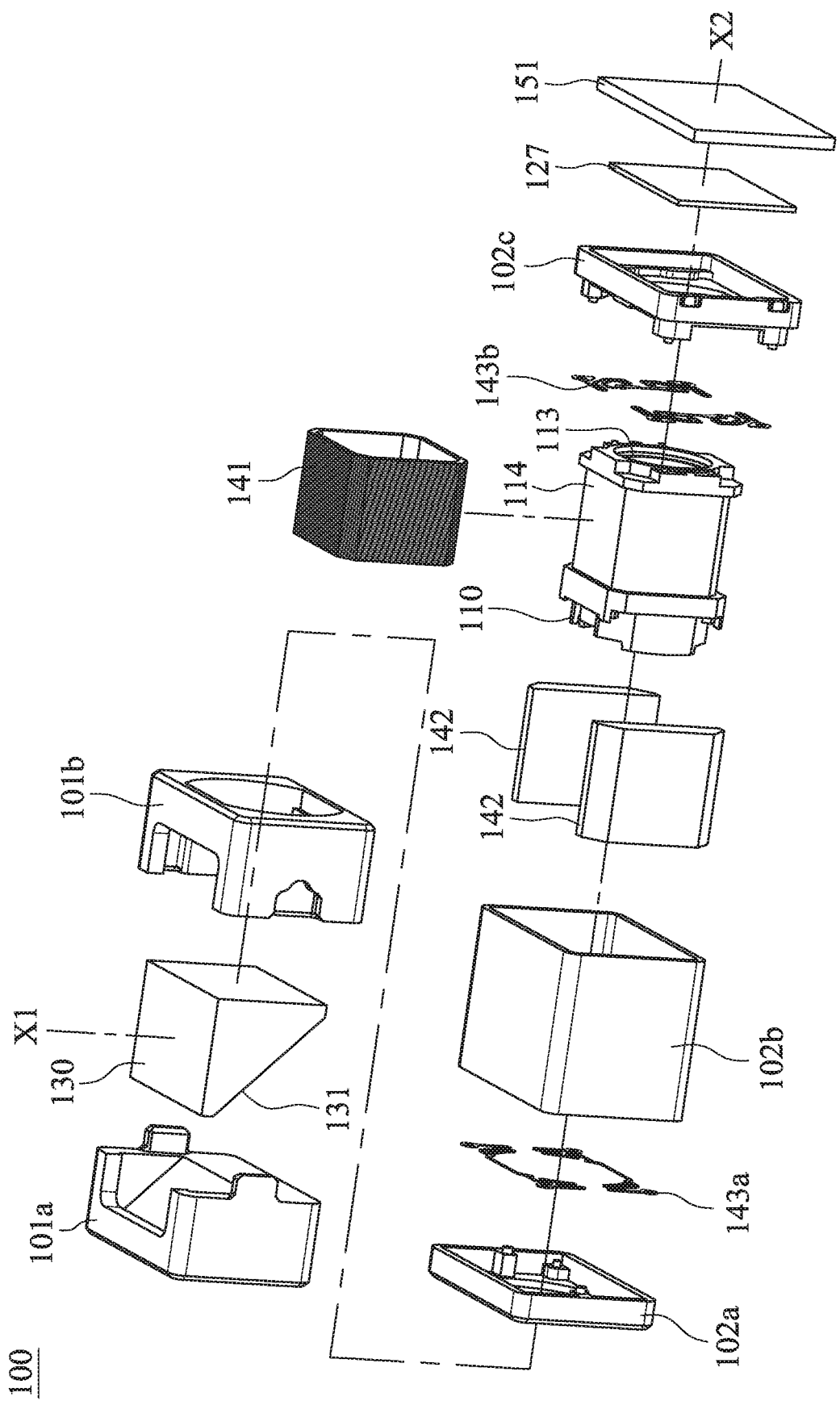
FIG. 1C is another exploded view of the camera module according to the 1st embodiment in FIG. 1A.

FIG. 1A is a three-dimensional view of a camera module 100 according to the 1st embodiment of the present disclosure. FIG. 1B is an exploded view of the camera module 100 according to the 1st embodiment in FIG. 1A. FIG. 1C is another exploded view of the camera module 100 according to the 1st embodiment in FIG. 1A. In FIG. 1A, FIG. 1B, and FIG. 1C, the camera module 100 includes a plastic carrier 110, an imaging lens assembly 120 (labelled in FIG. 1E), a reflective element 130, and a plurality of auto-focusing elements (its reference numeral is omitted), wherein in the 1st embodiment, the reflective element 130 is a prism element.

Figure 1D:
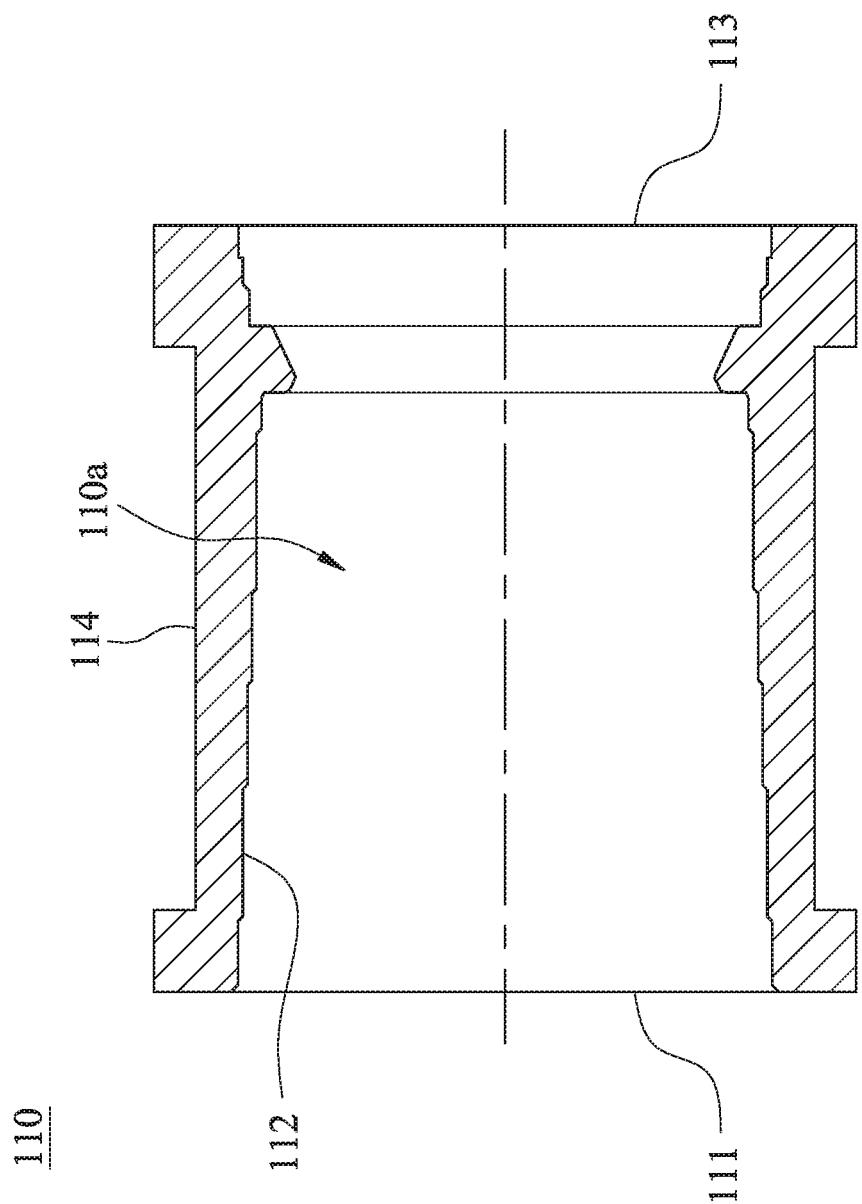
FIG. 1D is a cross-sectional view of the plastic carrier of the camera module according to the 1st embodiment in FIG. 1A.

FIG. 1D is a cross-sectional view of the plastic carrier 110 of the camera module 100 according to the 1st embodiment in FIG. 1A. In FIGS. 1B, 1C and 1D, the plastic carrier 110 includes an inner portion (its reference numeral is omitted) and an outer portion (its reference numeral is omitted). An inner space 110a is defined by the inner portion, and the inner portion includes, from an object side to an image side, an object-side opening 111, at least one inner annular surface 112, and an image-side opening 113. The object-side opening 111 is closer to the reflective element 130 than the image-side opening 113 thereto; in the 1st embodiment, a number of the inner annular surfaces 112 is at least three, more specifically, the number of the inner annular surfaces 112 is six. The outer portion includes at least one mounting structure 114; in the 1st embodiment, the number of the mounting structure 114 is one. In the 1st embodiment, the inner portion of the plastic carrier 110 and the mounting structure 114 of the outer portion are integrally formed into a black plastic article via an injection molding, and the plastic carrier 110 is a threadless structure. A material of the plastic carrier 110 includes a chemical fiber.

Figure 1E:
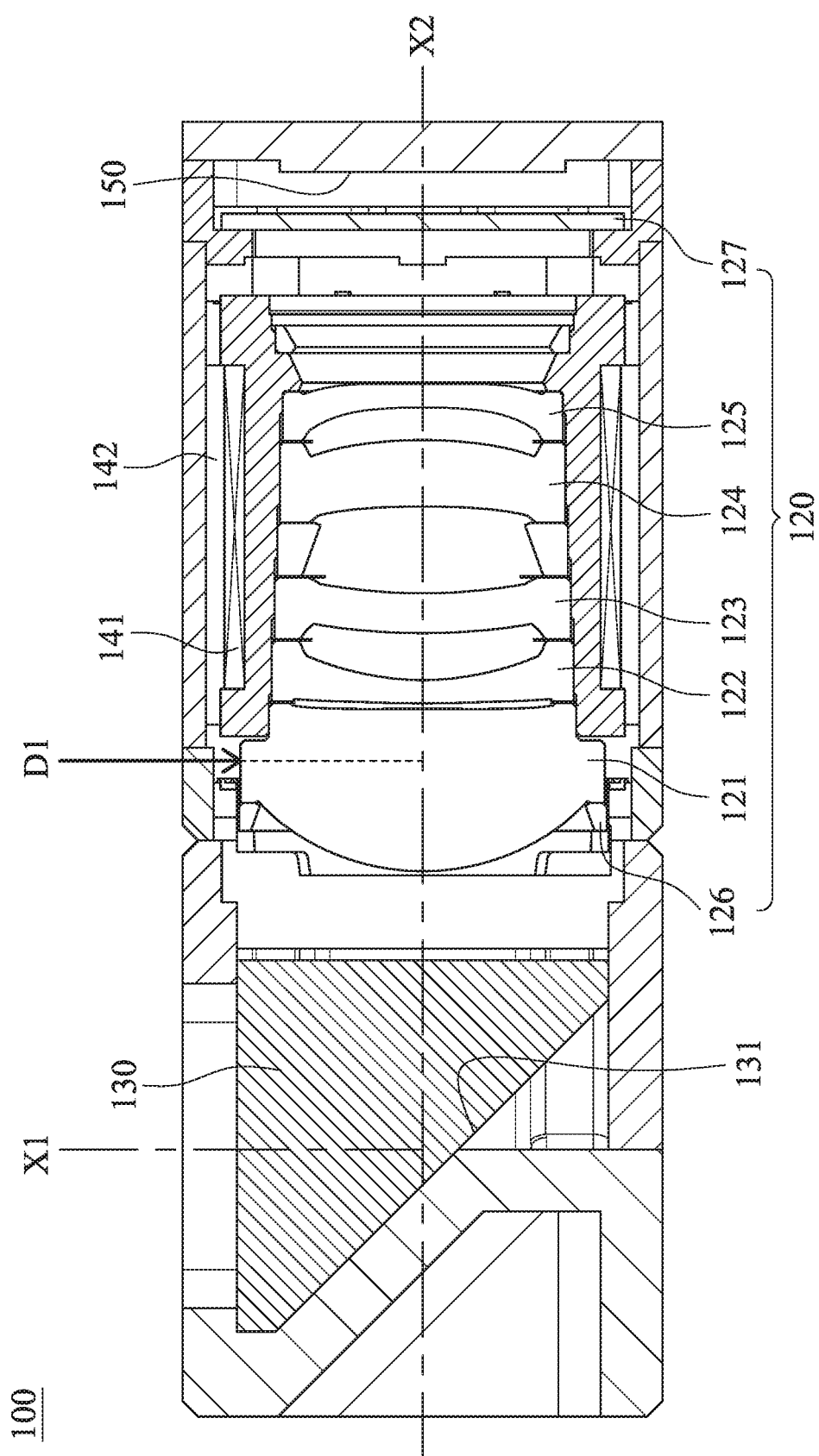
FIG. 1E is a schematic view of the imaging lens assembly of the camera module according to the 1st embodiment in FIG. 1A.

FIG. 1E is a schematic view of the imaging lens assembly 120 of the camera module 100 according to the 1st embodiment in FIG. 1A. In FIG. 1B, FIG. 1C, FIG. 1D and FIG. 1E, the imaging lens assembly 120 is disposed in the inner space 110a of the plastic carrier 110, and includes a plurality of lens elements and a second optical axis X2; more specifically, the imaging lens assembly 120 includes five lens elements made of plastic materials, which are a first lens element 121, a second lens element 122, a third lens element 123, a fourth lens element 124, and a fifth lens element 125, respectively, and the first lens element 121 is the closest lens element to the reflective element 130 among the lens elements of the imaging lens assembly 120. In FIG. 1E, one of the lens elements of the imaging lens assembly 120 closest to the reflective element 130 is exposed out of the plastic carrier 110 along a direction D1 vertical to the second optical axis X2, that is, the first lens element 121 is not covered by the plastic carrier 110 in the direction D1, and the first lens element 121 is exposed in the direction D1 from at least one notch disposed on the plastic carrier 110. Moreover, one of the lens element of the imaging lens assembly 120 closest to the reflective element 130 (that is, the first lens element 121 in the 1st embodiment) has a largest central thickness among central thicknesses of the lens elements of the imaging lens assembly 120.

Furthermore, the imaging lens assembly 120 can further include a retaining ring 126 disposed in the plastic carrier 110 and close to the object-side opening 111, so as to locate the lens elements (that is, the first lens element 121 to the fifth lens element 125) in the inner space 110a.

The reflective element 130 is for folding an image light by a reflective surface 131 thereof into the imaging lens assembly 120, wherein the reflective element 130 includes the first optical axis X1, and the first optical axis X1 is folded into the second optical axis X2 via the reflective surface 131. In the 1st embodiment, a number of the reflective element 130 is only one.

Figure 1F:
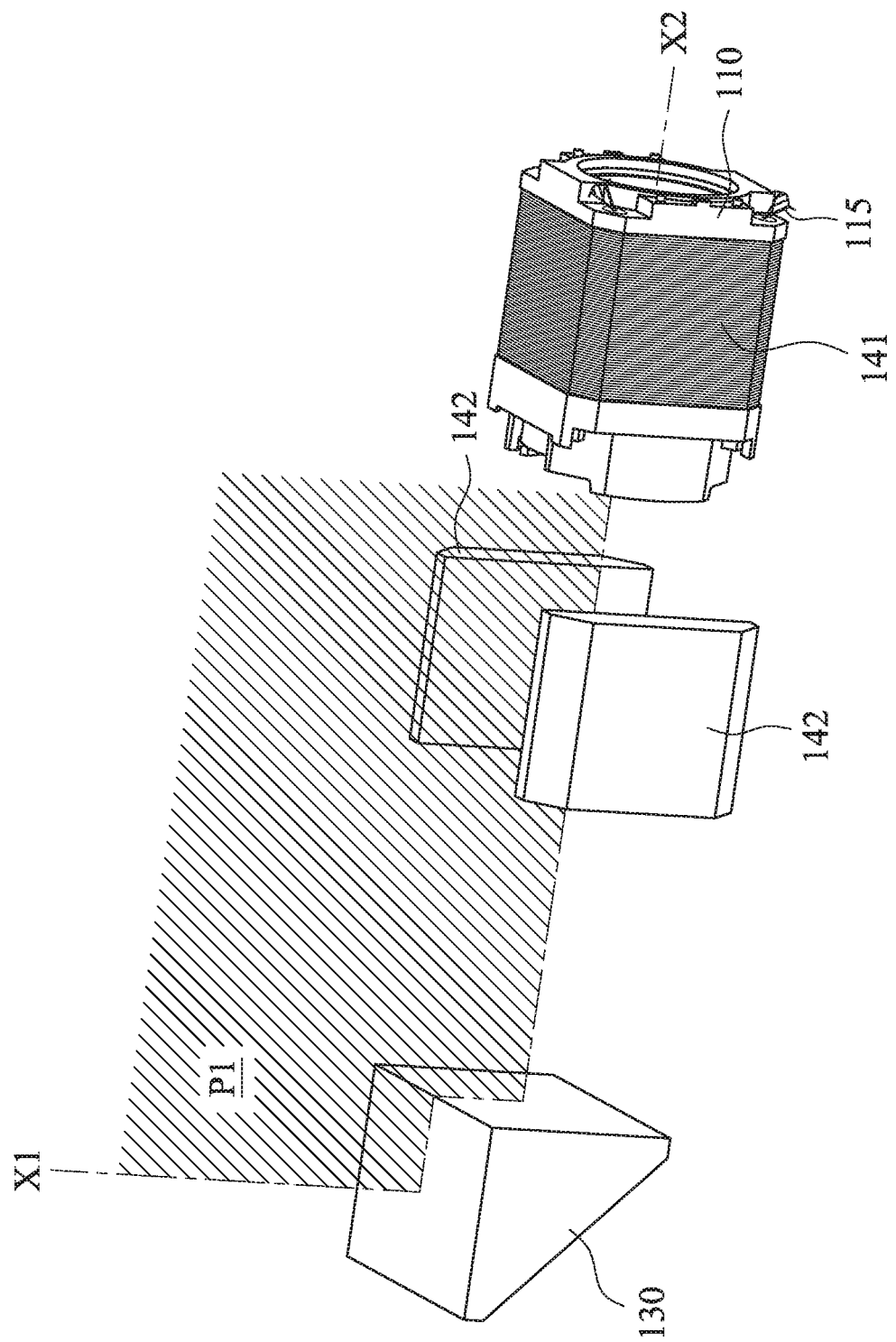
FIG. 1F is a schematic view of the arrangement of the magnets of the camera module according to the 1st embodiment in FIG. 1A.

The auto-focusing elements include the at least two magnets 142 and the at least one wiring element 141, wherein the auto-focusing elements are for moving the plastic carrier 110 along the second optical axis X2 of the imaging lens assembly 120, and the magnets 142 or the wiring element 141 is mounted on the mounting structure 114 of the outer portion; in the 1st embodiment, the wiring element 141 is disposed on the mounting structure 114; more specifically, in the 1st embodiment, a number of the wiring element 141 is only one, and the wiring element 141 surrounds the mounting structure 114 of the outer portion of the plastic carrier 110. FIG. 1F is a schematic view of the arrangement of the magnets 142 of the camera module 100 according to the 1st embodiment in FIG. 1A. In FIG. 1F, the first optical axis X1 and the second optical axis X2 form a plane P1, and the magnets 142 are respectively disposed on two sides of the plane P1, and are arranged equally. In the 1st embodiment, the wiring element 141 is disposed on the plastic carrier 110 and faces towards the magnets 142.

In FIG. 1B and FIG. 1C, the auto-focusing elements can further include a first sheet elastic element 143a and a second sheet elastic element 143b, wherein the first sheet elastic element 143a and the second sheet elastic element 143b are arranged along the second optical axis X2 in pairs.

Figure 1G:
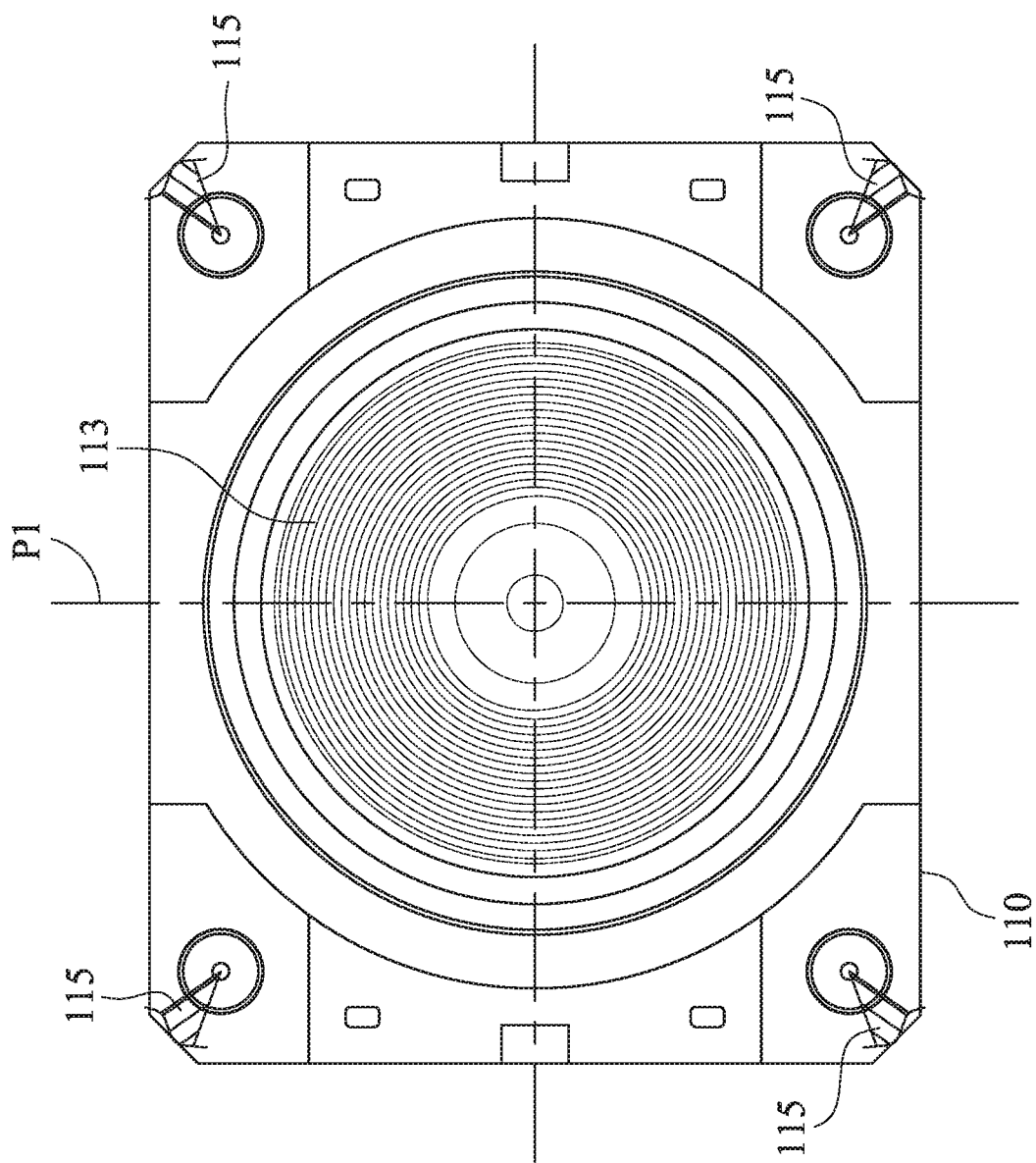
FIG. 1G is a schematic view of an end surface of the plastic carrier of the camera module according to the 1st embodiment in FIG. 1A.

FIG. 1G is a schematic view of an end surface of the plastic carrier 110 of the camera module 100 according to the 1st embodiment in FIG. 1A, which shows the image-end surface of the plastic carrier 110. In FIG. 1F and FIG. 1G, the plastic carrier 110 further includes the at least two gate traces 115 respectively disposed on the two sides of the plane P1 formed by the first optical axis X1 and the second optical axis X2. With respect to object-side opening 111, the gate traces 115 are closer to the image-side opening 113. More specifically, in the 1st embodiment, a number of the gate traces 115 is four.

Figure 1H:
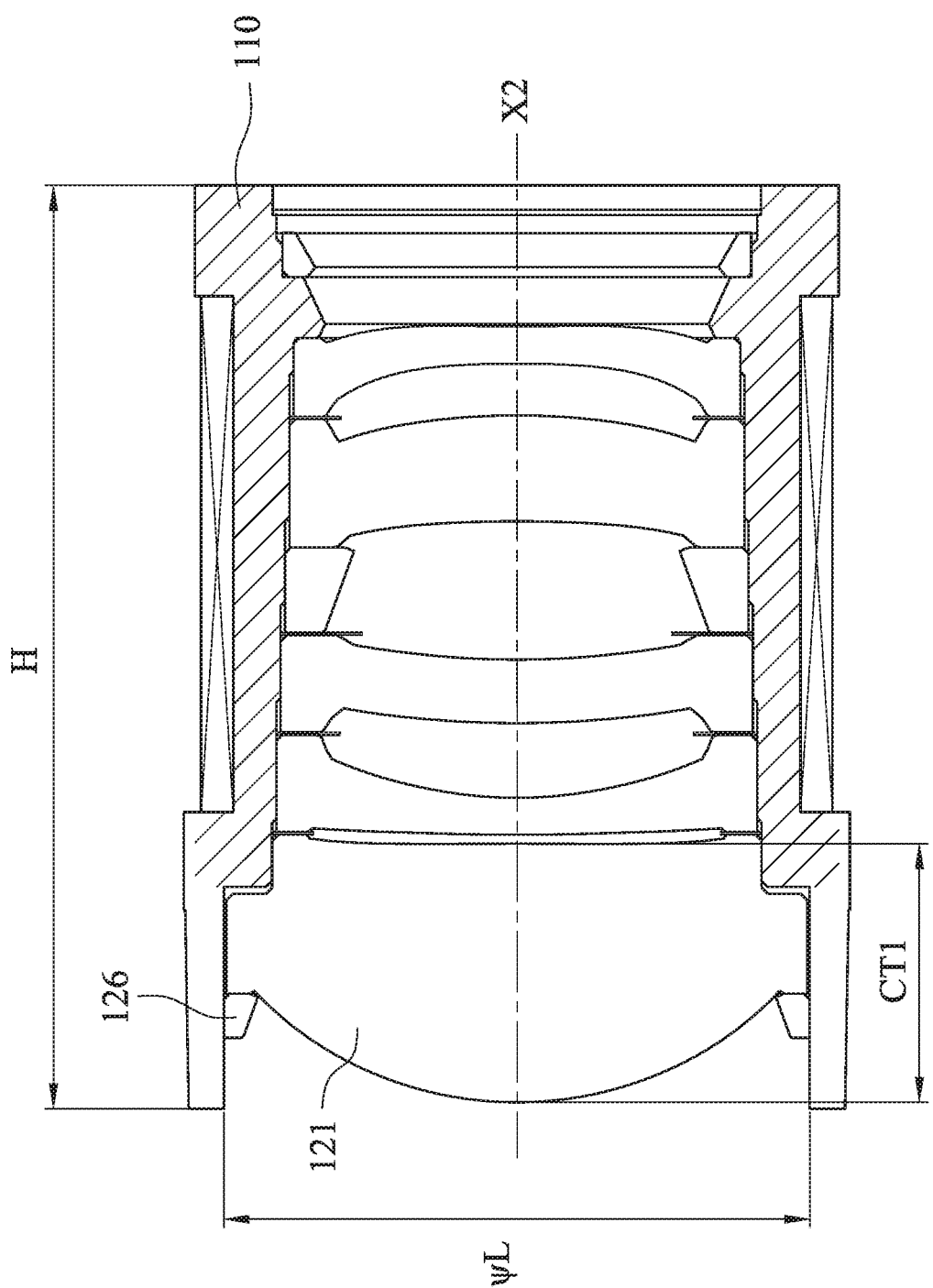
FIG. 1H is a schematic view of parameters $\psi L$, H, and CT1 of the camera module according to the 1st embodiment in FIG. 1A.

FIG. 1H is a schematic view of parameters ψL, H, and CT1 of the camera module 100 according to the 1st embodiment in FIG. 1A. In the 1st embodiment, when a height of the plastic carrier 110 is H, an outer diameter of the retaining ring 126 is ψL, a central thickness of the first lens element 121 is CT1 (that is, the thickness of the first lens element 121 on the second optical axis X2), a half of a maximum field of view of the imaging lens assembly 120 is HFOV, a distance between an object-side surface of the first lens element 121 and an image surface 150 on the second optical axis X2 is TTL, and a focal length of the imaging lens assembly 120 is f, the following conditions of the Table 1 are satisfied, respectively.

TABLE 1

| 1st embodiment | | | |
|---|---|---|---|
| ψL (mm) | 4.75 | TTL (mm) | 12.7 |
| H (mm) | 7.5 | f (mm) | 14.46 |
| ψL/H | 0.63 | TTL/f | 0.88 |
| HFOV (degrees) | 9.75 | CT1 (mm) | 2.1 |

Moreover, in FIG. 1A, FIG. 1B, FIG. 1C, the camera module 100 can include an object-side housing (its reference numeral is omitted) and an image-side housing (its reference numeral is omitted). More specifically, the object-side housing includes a first object-side housing element 101a and a second object-side housing element 101b for accommodating the reflective element 130; the image-side housing includes a first image-side housing element 102a, a second image-side housing element 102b, and a third image-side housing element 102c for accommodating the imaging lens assembly 120 and the auto-focusing elements. The camera module 100 can be applied to an electronic device (not shown) by assembling the object-side housing and the image-side housing. Moreover, in FIG. 1B and FIG. 1C, when the camera module 100 is applied to an electronic device, the image surface 150 and an image sensor 151 are connected to the third image-side housing element 102c of the image-side housing and are disposed on the image surface 150.

2nd Embodiment

Figure 2A:
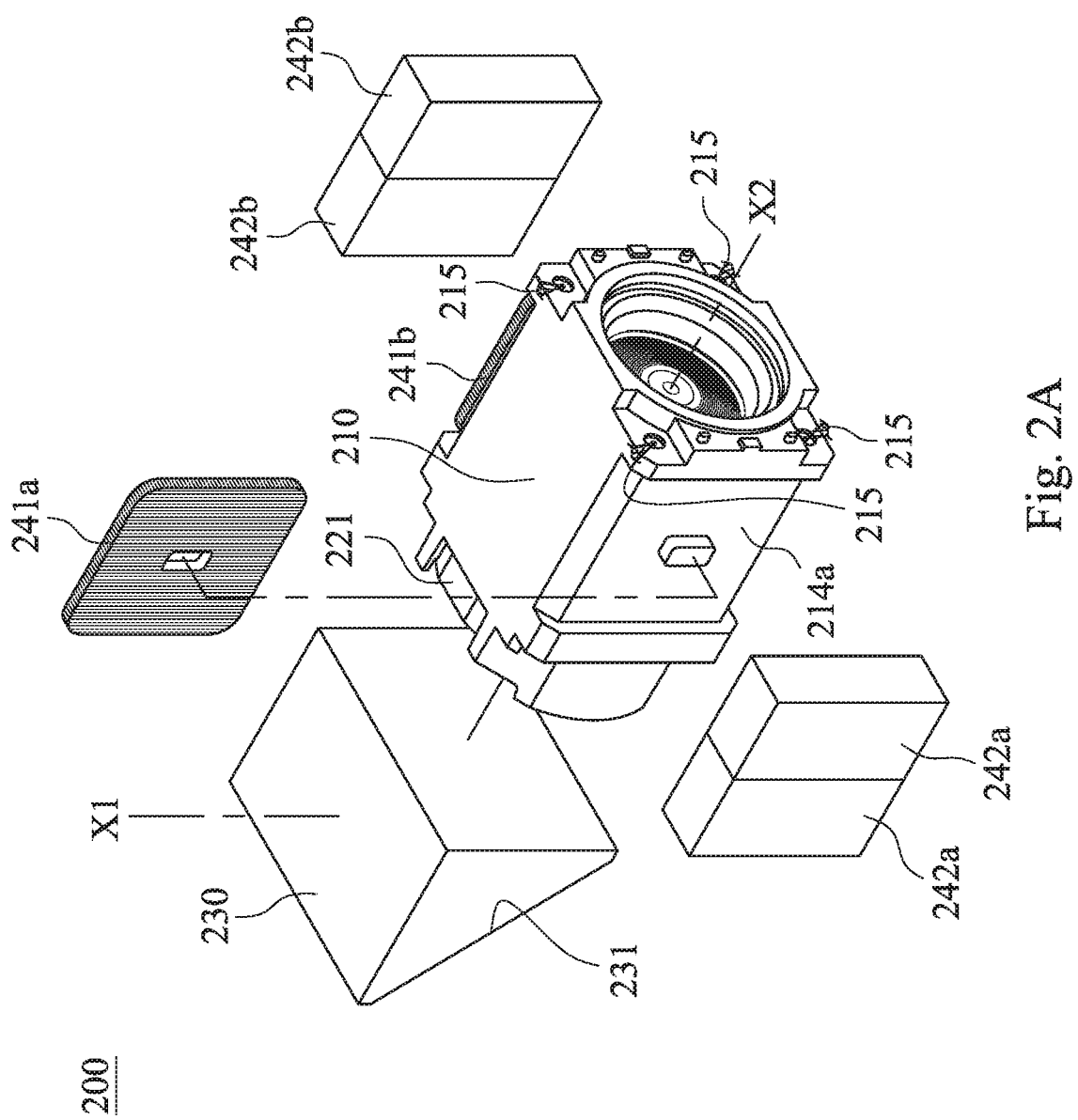
FIG. 2A is a three-dimensional view of a camera module according to the 2nd embodiment of the present disclosure.
Figure 2B:
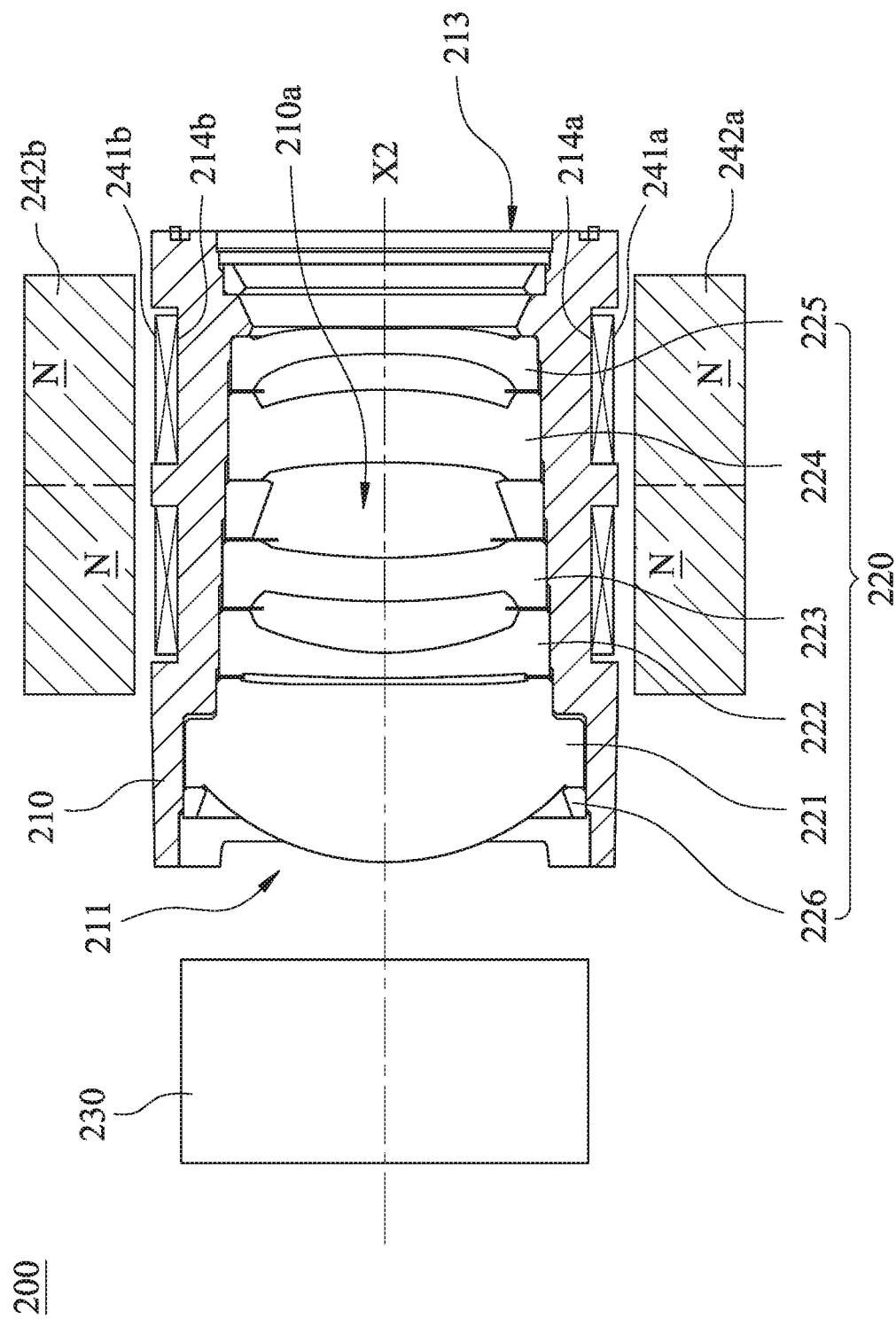
FIG. 2B is a cross-sectional view of the camera module according to the 2nd embodiment in FIG. 2A.

FIG. 2A is a three-dimensional view of a camera module 200 according to the 2nd embodiment of the present disclosure. FIG. 2B is a cross-sectional view of the camera module 200 according to the 2nd embodiment in FIG. 2A. In FIG. 2A and FIG. 2B, the camera module 200 includes a plastic carrier 210, an imaging lens assembly 220, a reflective element 230, and a plurality of the auto-focusing elements (its reference numeral is omitted).

Figure 2C:
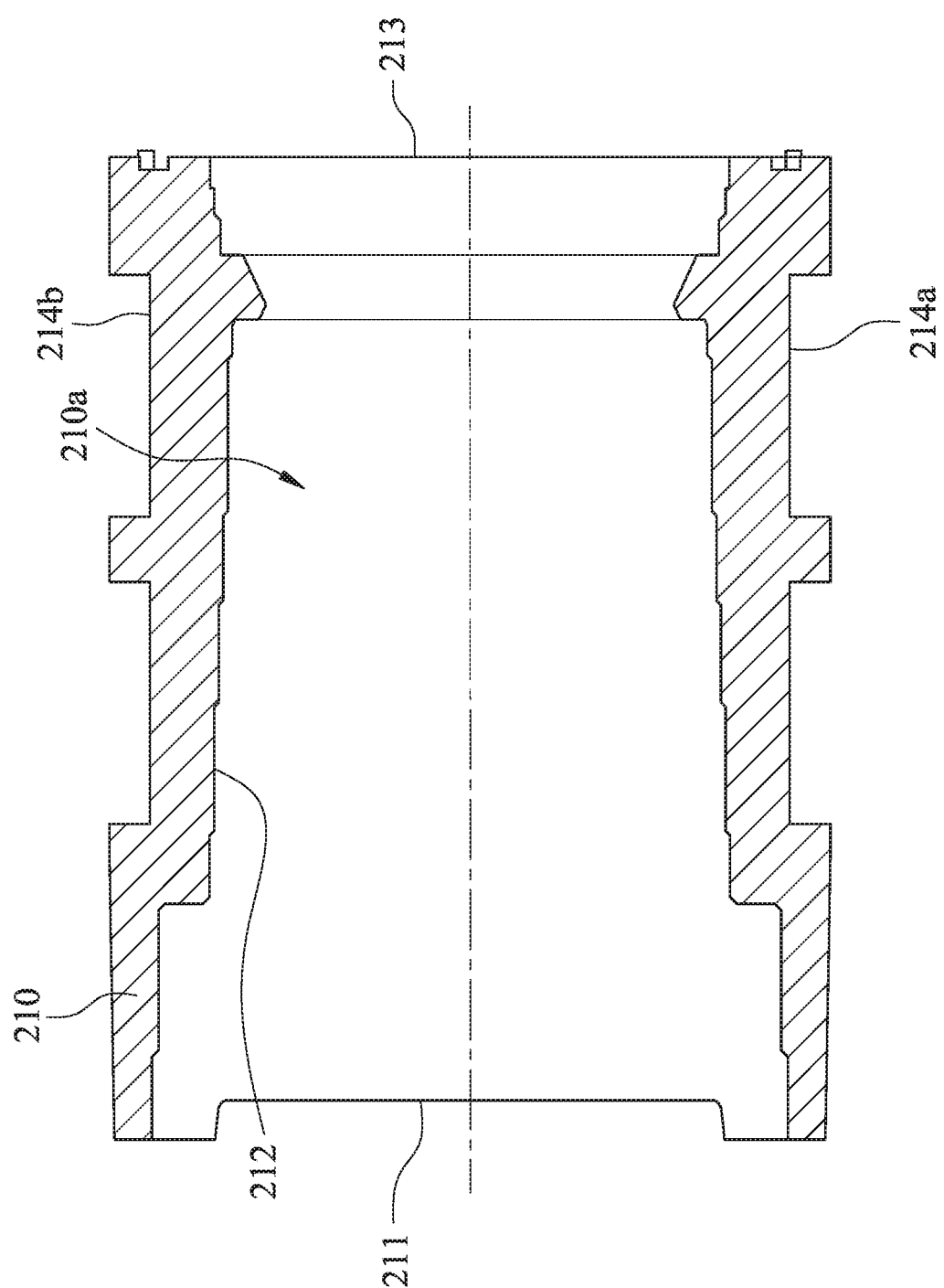
FIG. 2C is a cross-sectional view of the plastic carrier of the camera module according to the 2nd embodiment in FIG. 2A.

FIG. 2C is a cross-sectional view of the plastic carrier 210 of the camera module 200 according to the 2nd embodiment in FIG. 2A. The plastic carrier 210 includes an inner portion (its reference numeral is omitted) and an outer portion (its reference numeral is omitted). An inner space 210a is defined by the inner portion, and the inner portion includes, from an object side to an image side, an object-side opening 211, at least one inner annular surface 212, an object-side opening 213. The object-side opening 211 is closer to a reflective element 230 than the image-side opening 213 thereto; in the 2nd embodiment, a number of the inner annular surfaces 212 is at least three, more specifically, the number of the inner annular surfaces 212 is six. The outer portion includes at least one mounting structure 214a, 214b; in the 2nd embodiment, a number of the mounting structures 214a, 214b is two. In the 2nd embodiment, the inner portion of the plastic carrier 210 and the mounting structures 214a, 214b of the outer portion are integrally formed into a black plastic article via an injection molding, and the plastic carrier 210 is a threadless structure. A material of the plastic carrier 210 includes a chemical fiber.

Figure 2D:
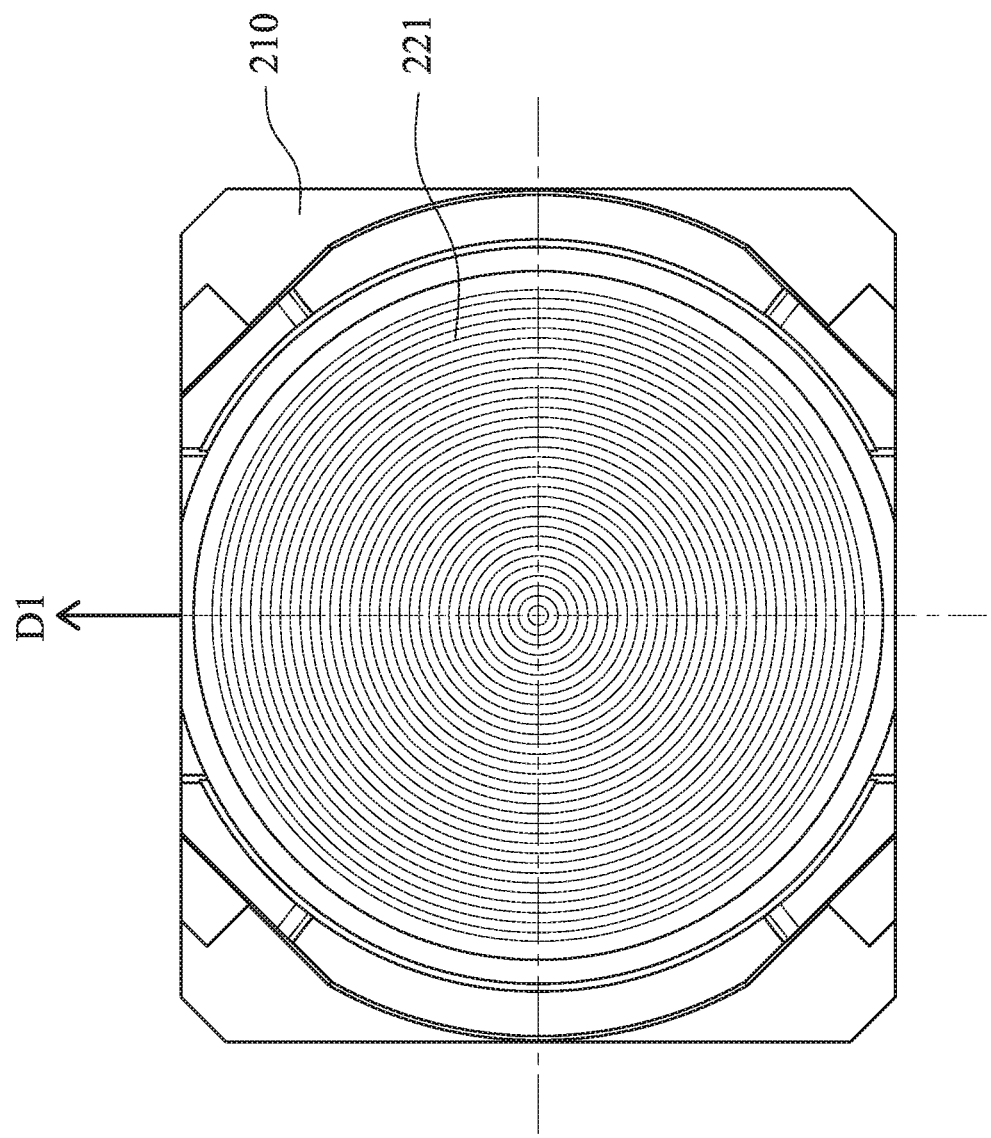
FIG. 2D is a plane view of an object side of the imaging lens assembly and the plastic carrier according to the 2nd embodiment in FIG. 2A.

In the 2nd embodiment, the imaging lens assembly 220 is disposed in the inner space 210a of the plastic carrier 210 and includes a plurality of lens elements and a second optical axis X2; more specifically, the imaging lens assembly 220 includes five lens elements made of plastic materials, which are a first lens element 221, a second lens element 222, a third lens element 223, a fourth lens element 224, and a fifth lens element 225, respectively, and the first lens element 221 is the closest lens element to the reflective element 230 among the lens elements of the imaging lens assembly 220. FIG. 2D is a plane view of an object side of the imaging lens assembly 220 and the plastic carrier 210 according to the 2nd embodiment in FIG. 2A. One of the lens elements of the imaging lens assembly 220 closest to the reflective element 230 is exposed out of the plastic carrier 210 along a direction D1 vertical to the second optical axis X2, that is, the first lens element 221 is not covered by the plastic carrier 210 in the direction D1, and the first lens element 221 is exposed in the direction D1 from at least one notch disposed on the plastic carrier 210. Moreover, one of the lens element of the imaging lens assembly 220 closest to the reflective element 230 (that is, the first lens element 221 in the 2nd embodiment) has a largest central thickness among central thicknesses of the lens elements of the imaging lens assembly 220.

Furthermore, the imaging lens assembly 220 can further include a retaining ring 226 disposed in the plastic carrier 210 and close to the object-side opening 211, so as to locate the lens elements (that is, the first lens element 221 to the fifth lens element 225) in the inner space 210a.

In FIG. 2A, the reflective element 230 is for folding an image light by a reflective surface 231 thereof into the imaging lens assembly 220, wherein the reflective element 230 includes the first optical axis X1, and the first optical axis X1 is folded into the second optical axis X2 via the reflective surface 230. In the 2nd embodiment, a number of the reflective element 230 is only one.

Figure 2E:
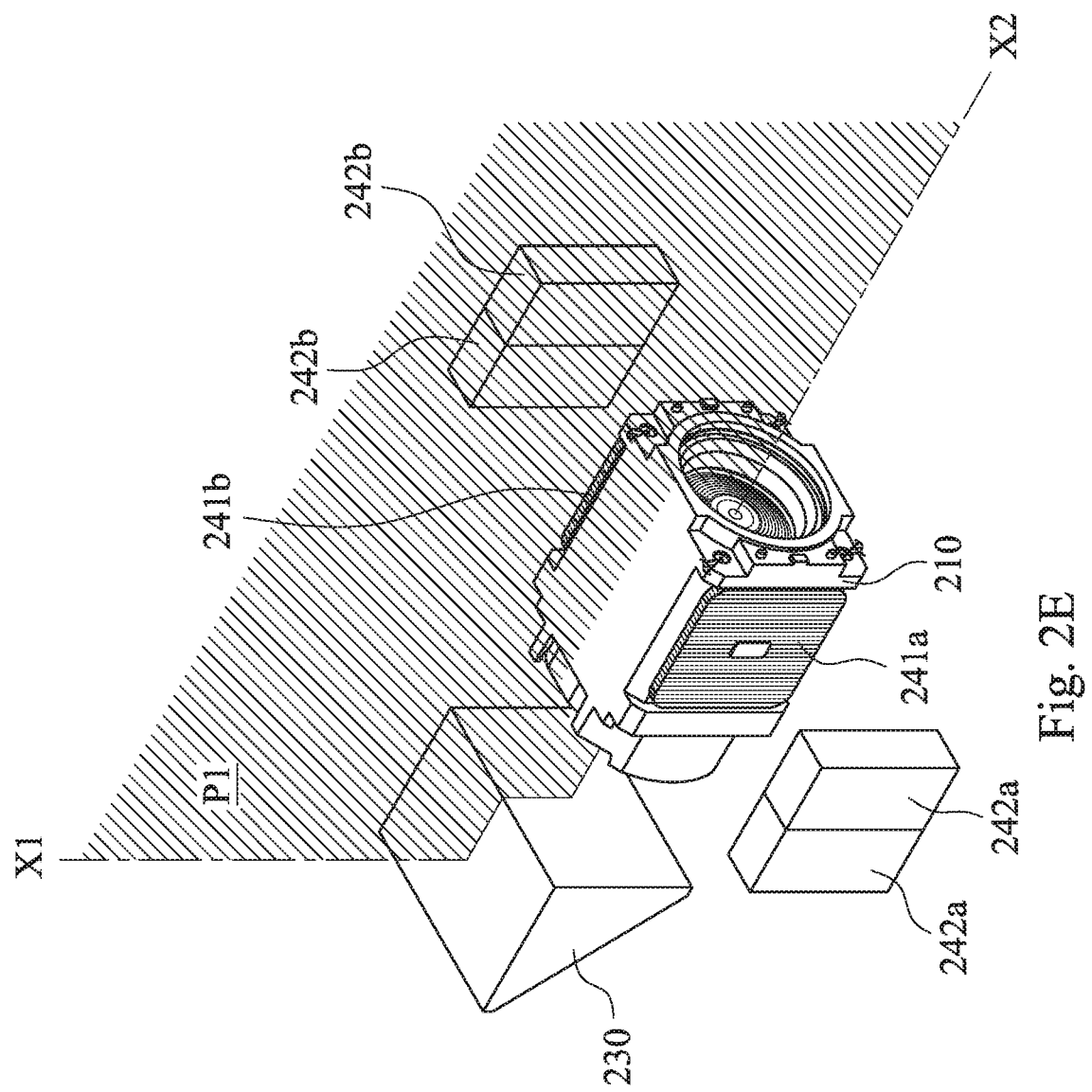
FIG. 2E is a schematic view of a plane P1 according to the 2nd embodiment in FIG. 2A.

According to the 2nd embodiment of FIG. 2A and FIG. 2B, the auto-focusing elements include four magnets 242a, 242b and two wiring elements 241a, 241b, wherein the auto-focusing elements are for moving the plastic carrier 210 along the second optical axis X2 of the imaging lens assembly 220. The magnets 242a, 242b or the wiring elements 241a, 241b are disposed on the mounting structures 214a, 214b of the outer portion; in the 2nd embodiment, the two wiring elements 241a, 241b are disposed on the mounting structures 214a, 214b, respectively. The two magnets 242a face towards the wiring element 241a in pairs. The N pole of one magnet 242a is disposed on a side facing towards the wiring element 241a, and the N pole of the another magnet 242a is disposed on a side away from the wiring element 241a; likewise, another two magnets 242b face towards the wiring element 241b in pairs. The N pole of one magnet 242b is disposed on a side facing towards the wiring element 241b, and the N pole of the another magnet 242b is disposed on a side away from the wiring element 241b, so as to drive the plastic carrier 210 to focus. FIG. 2E is a schematic view of a plane P1 according to the 2nd embodiment in FIG. 2A. In the 2nd embodiment, the first optical axis X1 and the second optical axis X2 form the plane P1, and the two magnets 242a, 242b are respectively disposed on two sides of the plane P1 in pairs, and are arranged equally.

In FIG. 2A, the plastic carrier 210 can further include at least two gate traces 215 respectively disposed on the two sides of the plane P1 formed by the first optical axis X1 and the second optical axis X2. With respect to object-side opening 211, all of the gate traces 215 are closer to the image-side opening 213. More specifically, in the 2nd embodiment, a number of the gate traces 215 is four.

Moreover, in the 2nd embodiment, the auto-focusing elements can further include a first sheet elastic element and a second sheet elastic element, wherein the arrangements and structures of the first sheet elastic element and the second sheet elastic element are the same as the first sheet elastic element 143a and the second sheet elastic element 143b in the 1st embodiment, and will not be described again herein.

Figure 2F:
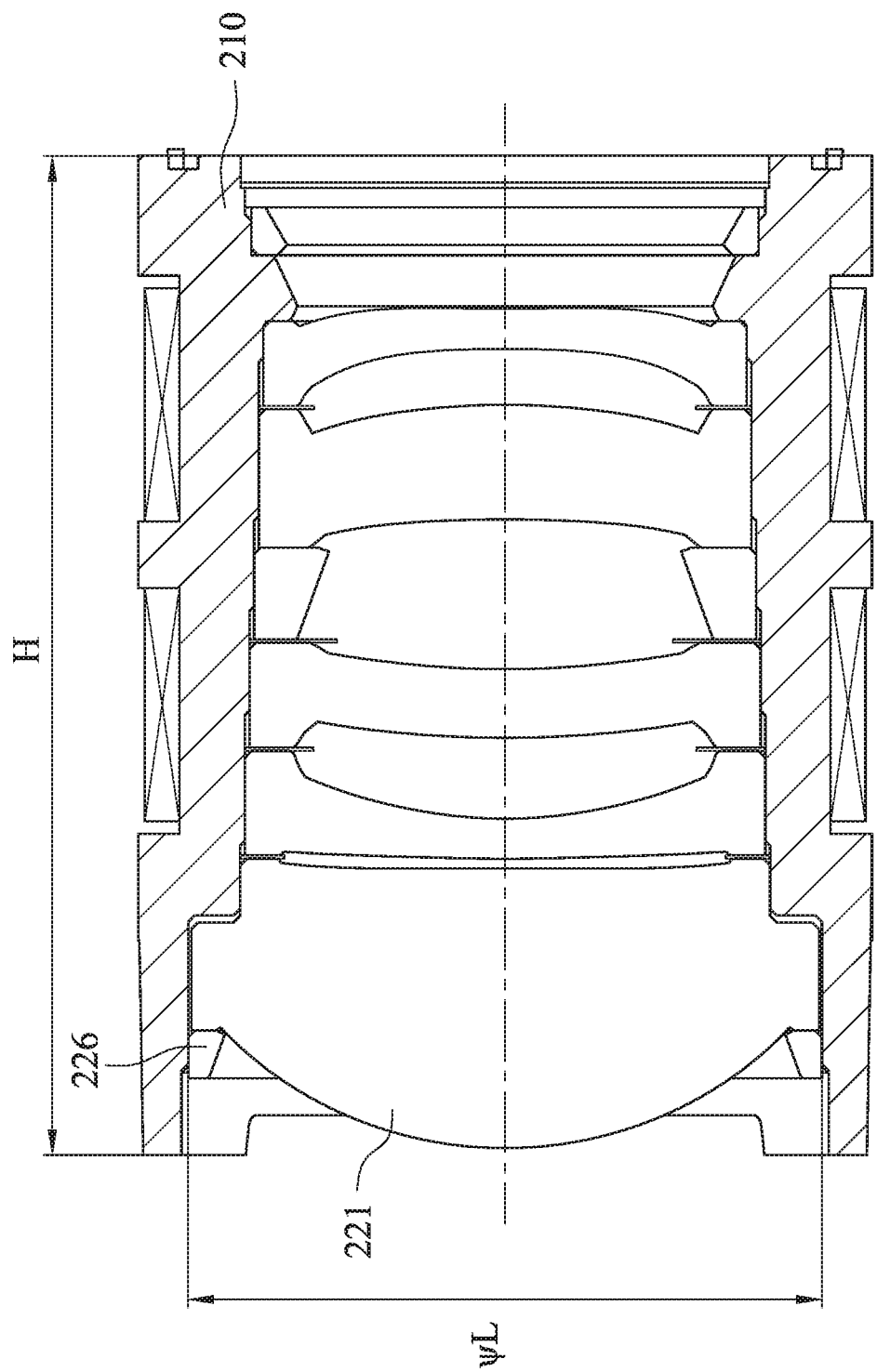
FIG. 2F is a schematic view of parameters $\psi L$, H, and CT1 of the camera module according to the 2nd embodiment in FIG. 2A.

FIG. 2F is a schematic view of parameters ψL, H, and CT1 of the camera module 200 according to the 2nd embodiment in FIG. 2A. In the 2nd embodiment, when a height of the plastic carrier 210 is H, an outer diameter of the retaining ring 226 is ψL, a half of a maximum field of view of the imaging lens assembly 220 is HFOV, a distance between an object-side surface of the first lens element 221 and an image surface (not shown) on the second optical axis X2 is TTL, and a focal length of the imaging lens assembly 220 is f, the following conditions of the Table 2 are satisfied, respectively.

TABLE 2

| 2nd embodiment | | | |
|---|---|---|---|
| ψL (mm) | 4.75 | TTL (mm) | 12.7 |
| H (mm) | 7.5 | f (mm) | 14.46 |

TABLE 2-continued

| 2nd embodiment | | | |
|---|---|---|---|
| ψL/H | 0.63 | TTL/f | 0.88 |
| HFOV (degrees) | 9.75 | CT1 (mm) | 2.1 |

3rd Embodiment

Figure 3A:
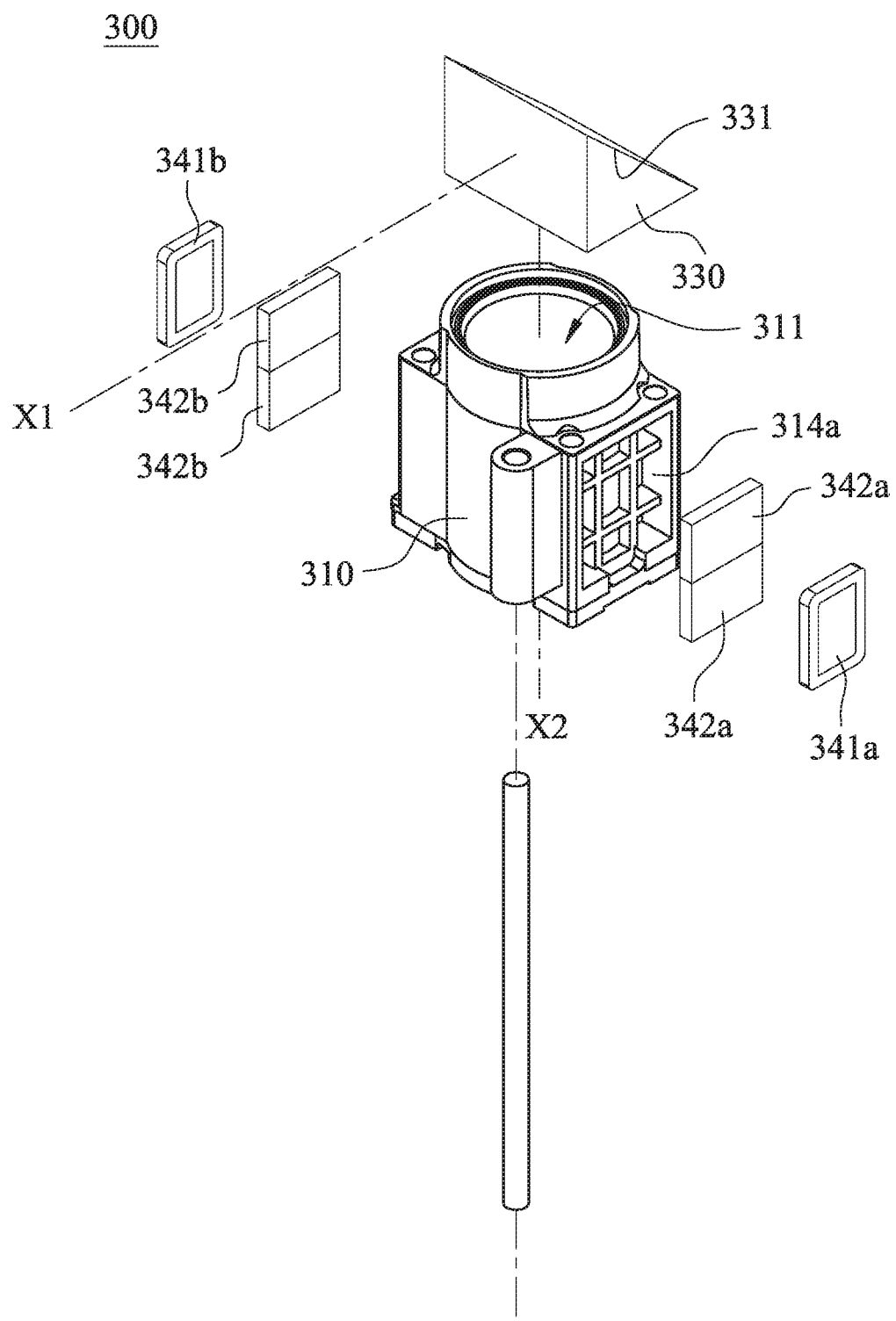
FIG. 3A is a three-dimensional view of a camera module according to the 3rd embodiment of the present disclosure.
Figure 3B:
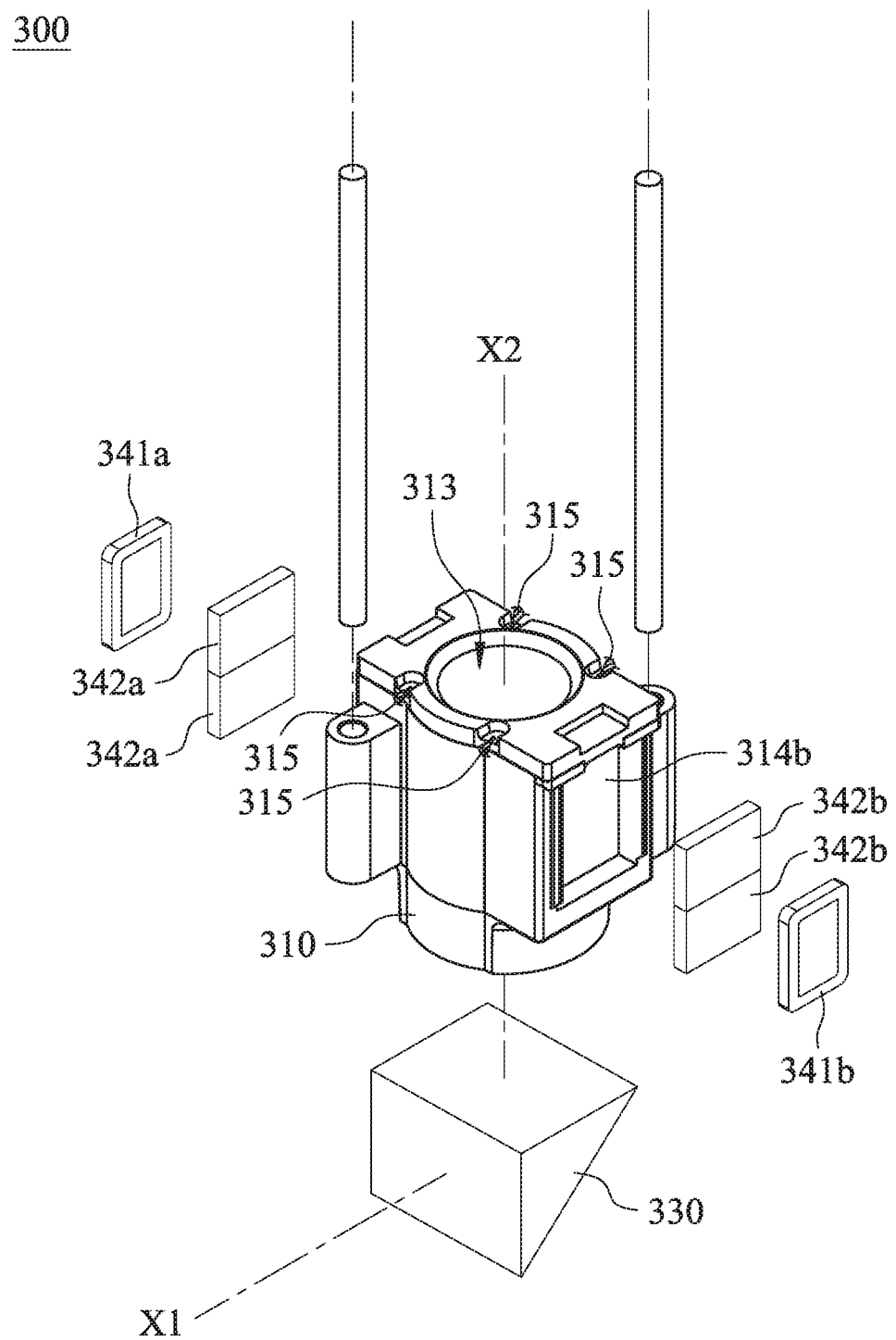
FIG. 3B is another three-dimensional view of the camera module according to the 3rd embodiment in FIG. 3A.
Figure 3C:
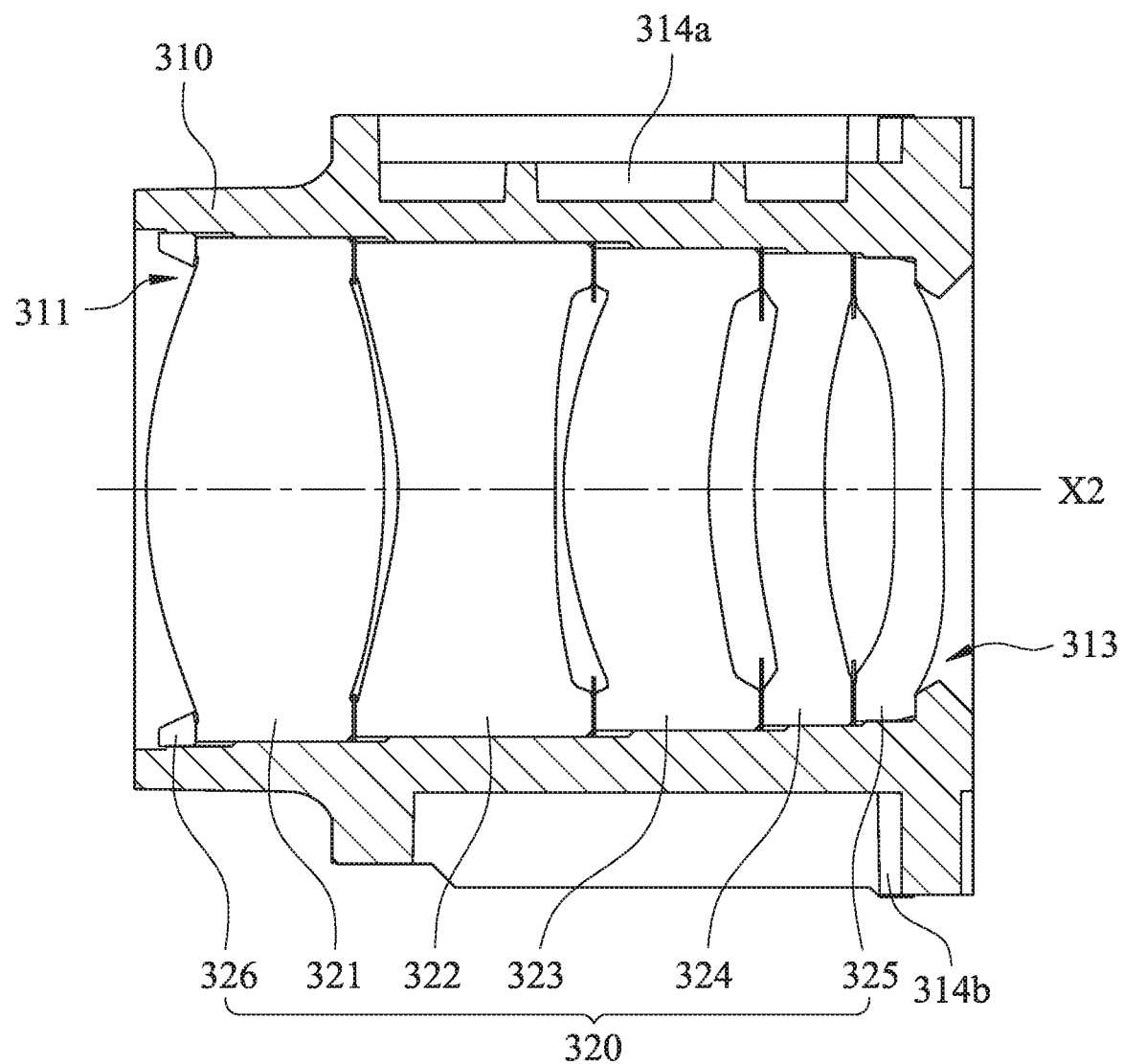
FIG. 3C is a cross-sectional view of the camera module according to the 3rd embodiment in FIG. 3A.

FIG. 3A is a three-dimensional view of a camera module 300 according to the 3rd embodiment of the present disclosure. FIG. 3B is another three-dimensional view of the camera module 300 according to the 3rd embodiment in FIG. 3A. FIG. 3C is a cross-sectional view of the camera module 300 according to the 3rd embodiment in FIG. 3A. In FIGS. 3A, 3B, and 3C, the camera module 300 includes a plastic carrier 310, an imaging lens assembly 320, a reflective element 330, and a plurality of auto-focusing elements (its reference numeral is omitted).

Figure 3D:
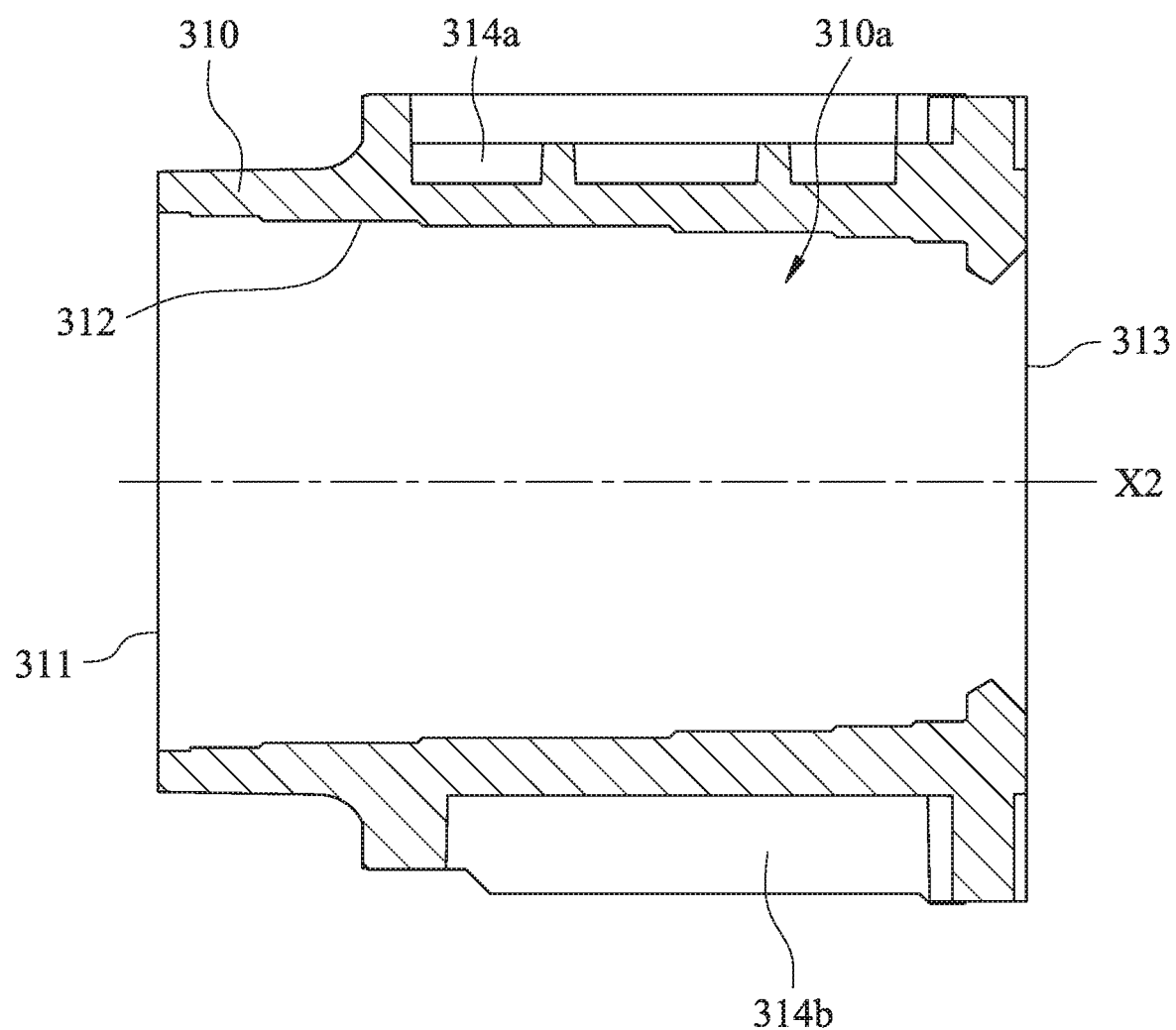
FIG. 3D is a cross-sectional view of the plastic carrier of the camera module according to the 3rd embodiment in FIG. 3A.

FIG. 3D is a cross-sectional view of the plastic carrier 310 of the camera module 300 according to the 3rd embodiment in FIG. 3A. The plastic carrier 310 includes an inner portion (its reference numeral is omitted) and an outer portion (its reference numeral is omitted). An inner space 310a is defined by the inner portion, and the inner portion includes, from an object side to an image side, an object-side opening 311, at least one inner annular surface 312, and an object-side opening 313. The object-side opening 311 is closer to the reflective element 330 than the image-side opening 313 thereto; in the 3rd embodiment, a number of inner annular surfaces 312 is at least three, more specifically, the number of inner annular surfaces 312 is five. The outer portion includes at least one mounting structure 314a and 314b; in the 3rd embodiment, a number of the mounting structures 314a, 314b is two. In the 3rd embodiment, the inner portion of the plastic carrier 310 and the mounting structure 314a, 314b of the outer portion are integrally formed into a black plastic article via an injection molding, and the plastic carrier 310 is a threadless structure. A material of the plastic carrier 310 includes a glass fiber.

In the 3rd embodiment, the imaging lens assembly 320 is disposed in the inner space 310a of the plastic carrier 310 and includes a plurality of lens elements and the second optical axis X2; more specifically, the imaging lens assembly 320 includes five lens elements made of plastic materials, which are a first lens element 321, a second lens element 322, a third lens element 323, a fourth lens element 324, and a fifth lens element 325, respectively, and all of the lens elements of the imaging lens assembly 320 (that is, the first lens element 321 to the fifth lens element 325) are located in the inner space 310a of the plastic carrier 310. Furthermore, one of the lens element of the imaging lens assembly 320 closest to the reflective element 330 (that is, the first lens element 321 in the 3rd embodiment) has a largest central thickness among central thicknesses of the lens elements of the imaging lens assembly 320.

In FIG. 3C, the imaging lens assembly 320 can further include a retaining ring 326 disposed in the plastic carrier 310 and close to the object-side opening 311 so as to locate the lens elements (that is, the first lens element 321 to the fifth lens element 325) in the inner space 310a.

In 3A, the reflective element 330 is for folding an image light by a reflective surface 331 of the reflective element 330 into the imaging lens assembly 320, wherein the reflective element 330 includes the first optical axis X1, and the first optical axis X1 is folded into the second optical axis X2 via the reflective surface 331. In the 3rd embodiment, a number of the reflective element 330 is only one.

Figure 3E:
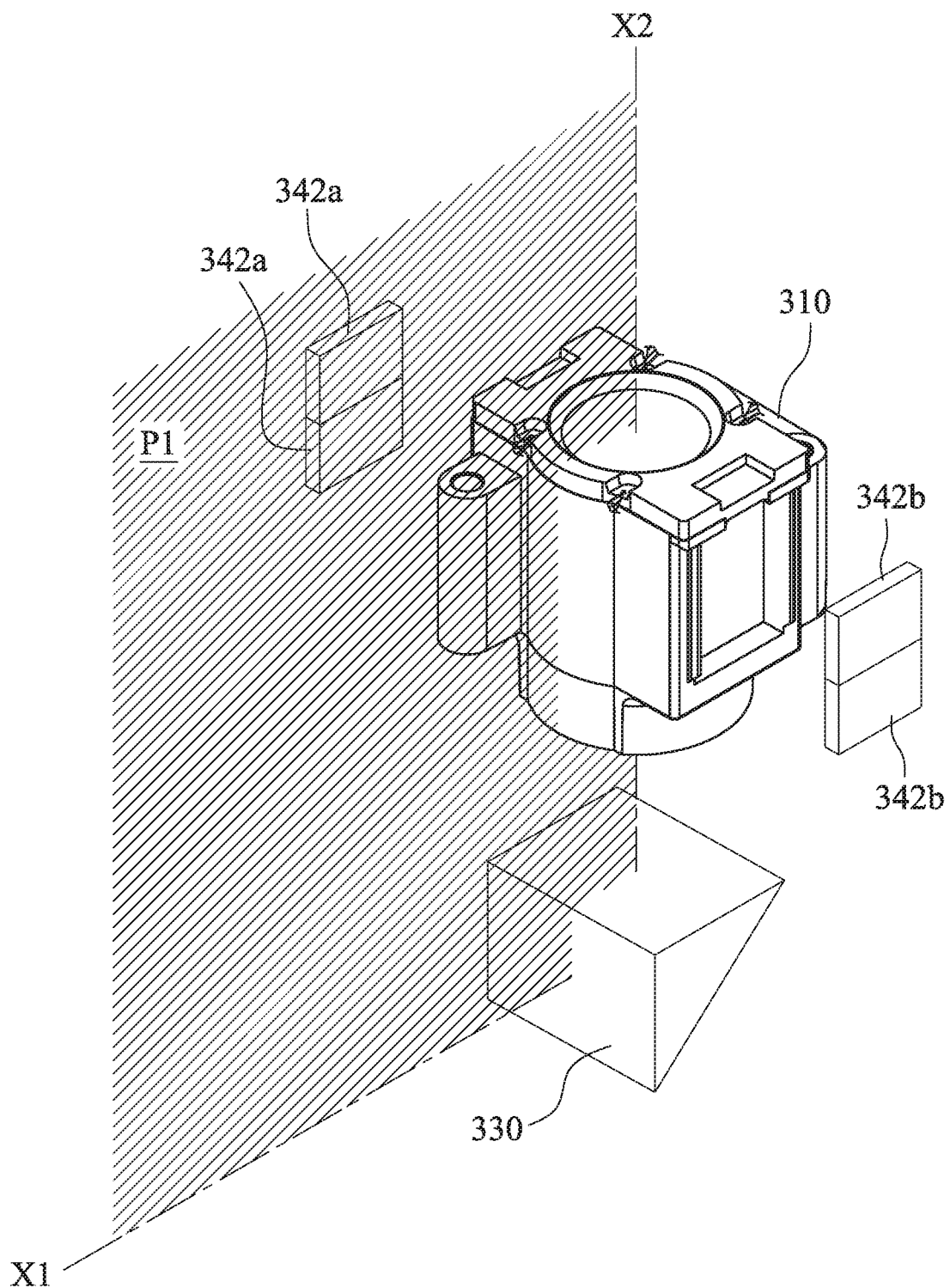
FIG. 3E is a schematic view of a plane P1 according to the 3rd embodiment in FIG. 3A.

According to the 3rd embodiment of FIG. 3A and FIG. 3B, the auto-focusing elements include four magnets 342a, 342b and two wiring elements 341a, 341b, wherein the auto-focusing elements are for moving the plastic carrier 310 along the second optical axis X2 of the imaging lens assembly 320. The four magnets 342a, 342b or the two wiring elements 341a, 341b are disposed on the mounting structures 314a, 314b of the outer portion; in the 3rd embodiment, the two magnets 342a are disposed in pairs on the mounting structure 314a, and facing towards the wiring element 341a. Another two magnets 342b are disposed in pairs on the mounting structure 314b and facing towards the wiring element 341b so as to drive the plastic carrier 310 to focus. FIG. 3E is a schematic view of a plane P1 according to the 3rd embodiment in FIG. 3A. In the 3rd embodiment, the first optical axis X1 and the second optical axis X2 form the plane P1, and the two magnets 342a, 342b are respectively disposed on two sides of the plane P1 in pairs, and are arranged equally.

In FIG. 3B, the plastic carrier 310 can further include at least two gate traces 315 respectively disposed on the two sides of the plane P1 formed by the first optical axis X1 and the second optical axis X2. With respect to object-side opening 311, the at least two gate traces 315 are closer to the image-side opening 313. More specifically, in the 3rd embodiment, a number of the gate traces 315 is four.

Moreover, in the 3rd embodiment, the auto-focusing elements further include a first sheet elastic element and a second sheet elastic element, wherein the arrangements and structures of the first sheet elastic element and the second sheet elastic element are the same as the first sheet elastic element 143a and the second sheet elastic element 143b in the 1st embodiment, and will not be described again herein.

Figure 3F:
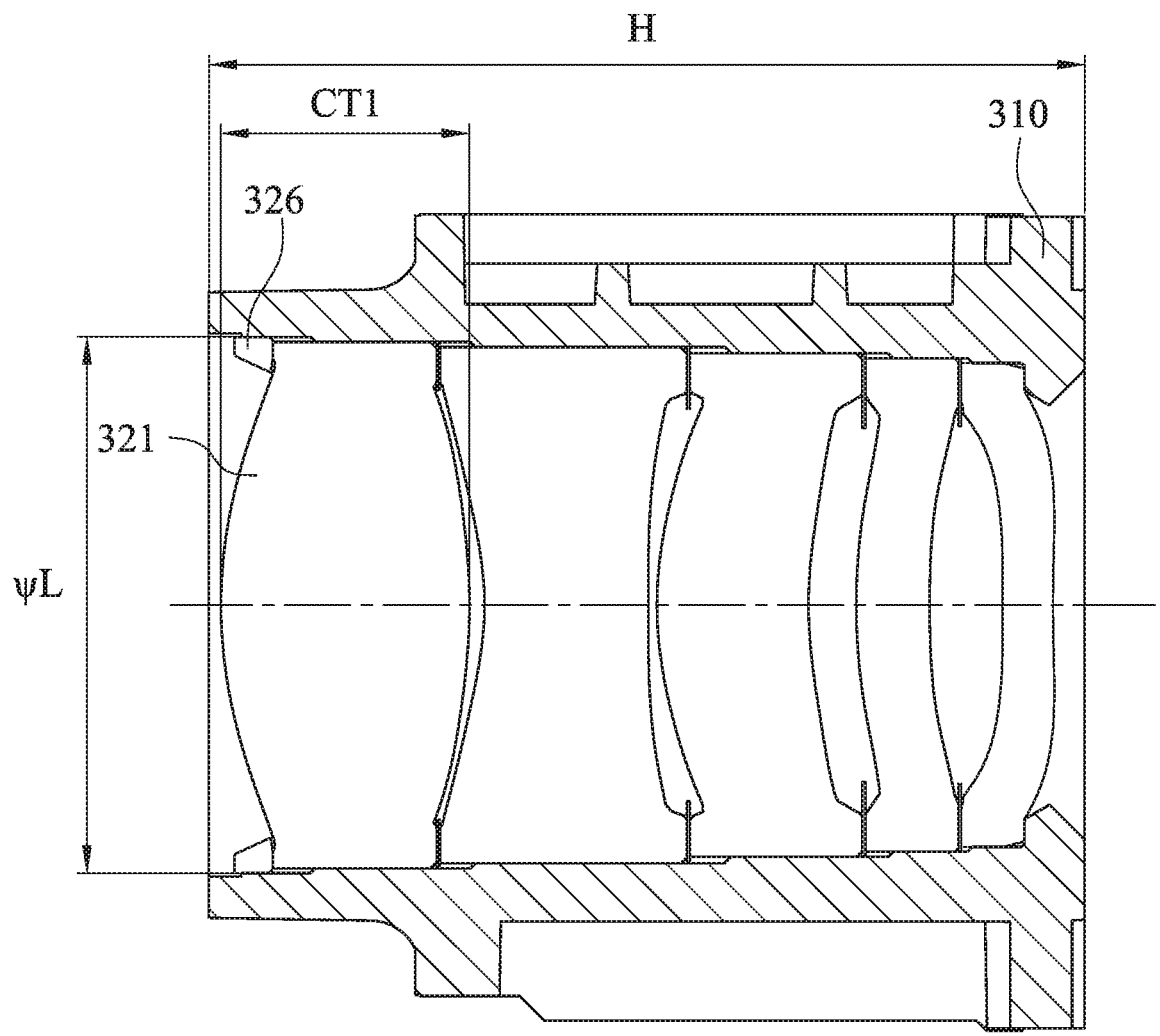
FIG. 3F is a schematic view of parameters $\psi L$, H, and CT1 of the camera module according to the 3rd embodiment in FIG. 3A.

FIG. 3F is a schematic view of parameters ψL, H, and CT1 of the camera module 300 according to the 3rd embodiment in FIG. 3A. In the 3rd embodiment, when a height of the plastic carrier 310 is H, an outer diameter of the retaining ring 326 is ψL, and a central thickness of the first lens element 321 is CT1 (that is, the thickness of the first lens element 321 on the second optical axis X2). Moreover, in the 3rd embodiment, when a half of a maximum field of view of the imaging lens assembly 320 is HFOV, a distance between an object-side surface of the first lens element 321 and an image surface (not shown) on the second optical axis X2 is TTL, and a focal length of the imaging lens assembly 320 is f, the following conditions of the Table 3 are satisfied, respectively.

TABLE 3

3rd embodiment

| | | | |
|---|---|---|---|
| ψL (mm) | 4.32 | TTL (mm) | 11.3 |
| H (mm) | 7.05 | f (mm) | 10.7 |
| ψL/H | 0.61 | TTL/f | 1.06 |
| HFOV (degrees) | 15.1 | CT1 (mm) | 2 |

4th Embodiment

Figure 4A:
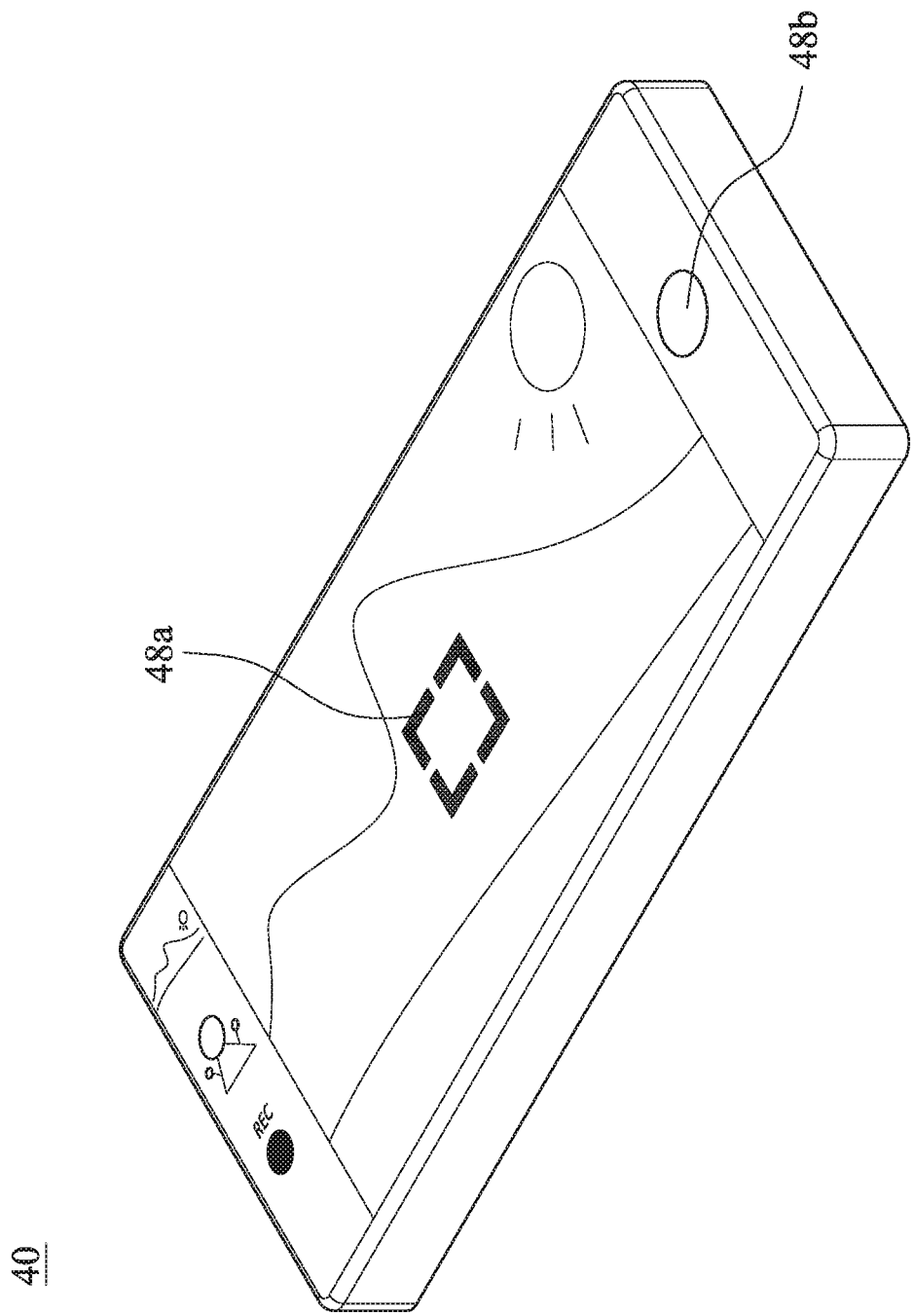
FIG. 4A is a schematic view of an electronic device according to the 4th embodiment of the present disclosure.
Figure 4B:
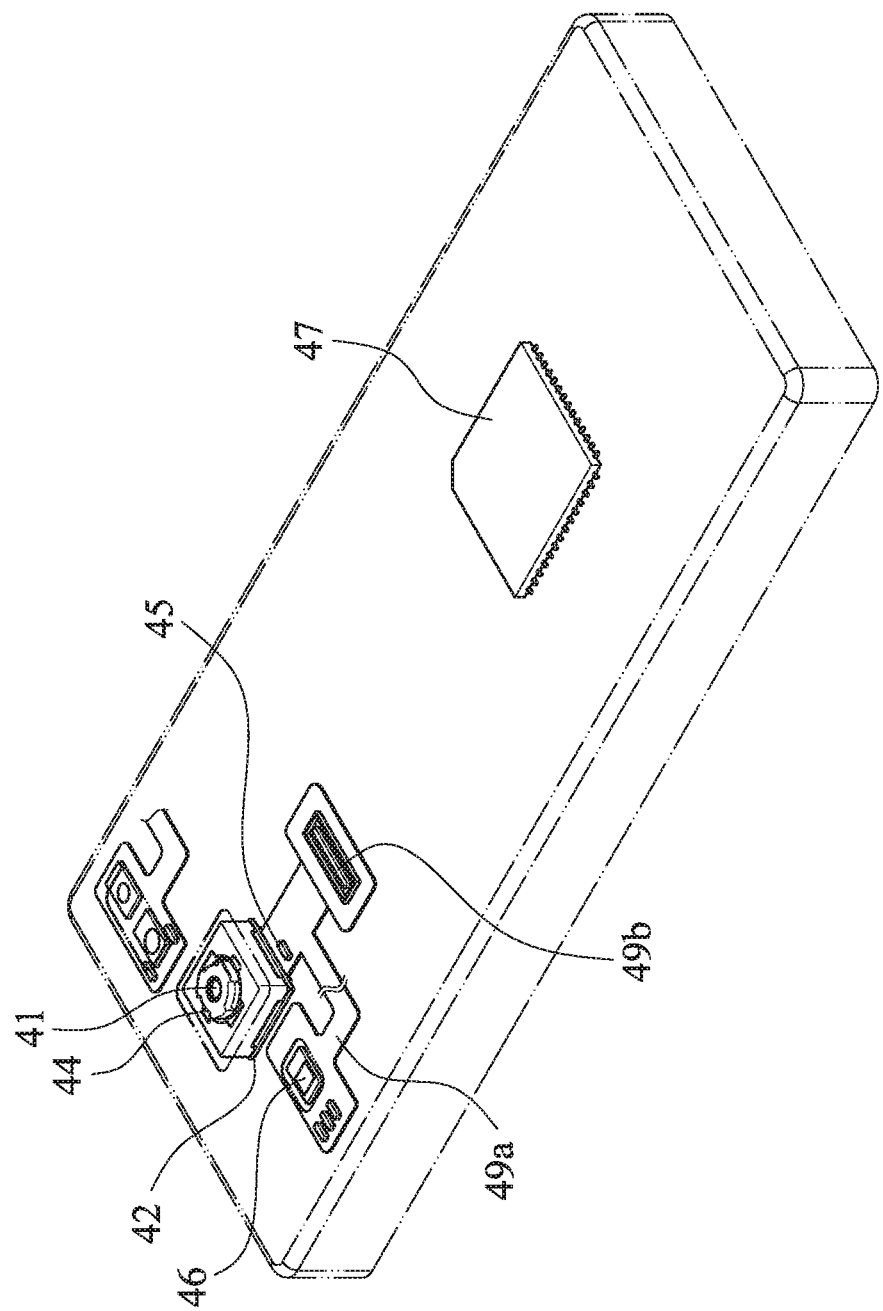
FIG. 4B is another schematic view of the electronic device according to the 4th embodiment.

FIG. 4A is a schematic view of an electronic device 40 according to the 4th embodiment of the present disclosure. FIG. 4B is another schematic view of the electronic device 40 according to the 4th embodiment. In FIG. 4A and FIG. 4B, the electronic device 40 is a smart phone according to the 4th embodiment. The electronic device 40 includes a camera module 41 according to the present disclosure and an image sensor 42, wherein the camera module 41 can be any one of the camera modules of the aforementioned embodiments, but is not limited thereto. The image sensor 42 is disposed on an image surface (not shown) of the camera module 41. Therefore, it is favorable for satisfying requirements of the mass production and appearance of the camera module applied to the electronic device nowadays.

Specifically, the user activates the capturing mode by the user interface 48 of the electronic device 40, wherein the user interface 48 of the 4th embodiment can be a touch screen 48a, a button 48b, etc. At this moment, the camera module 41 collects imaging light on the image sensor 42 and outputs electronic signals associated with images to an image signal processor (ISP) 47.

Figure 4C:
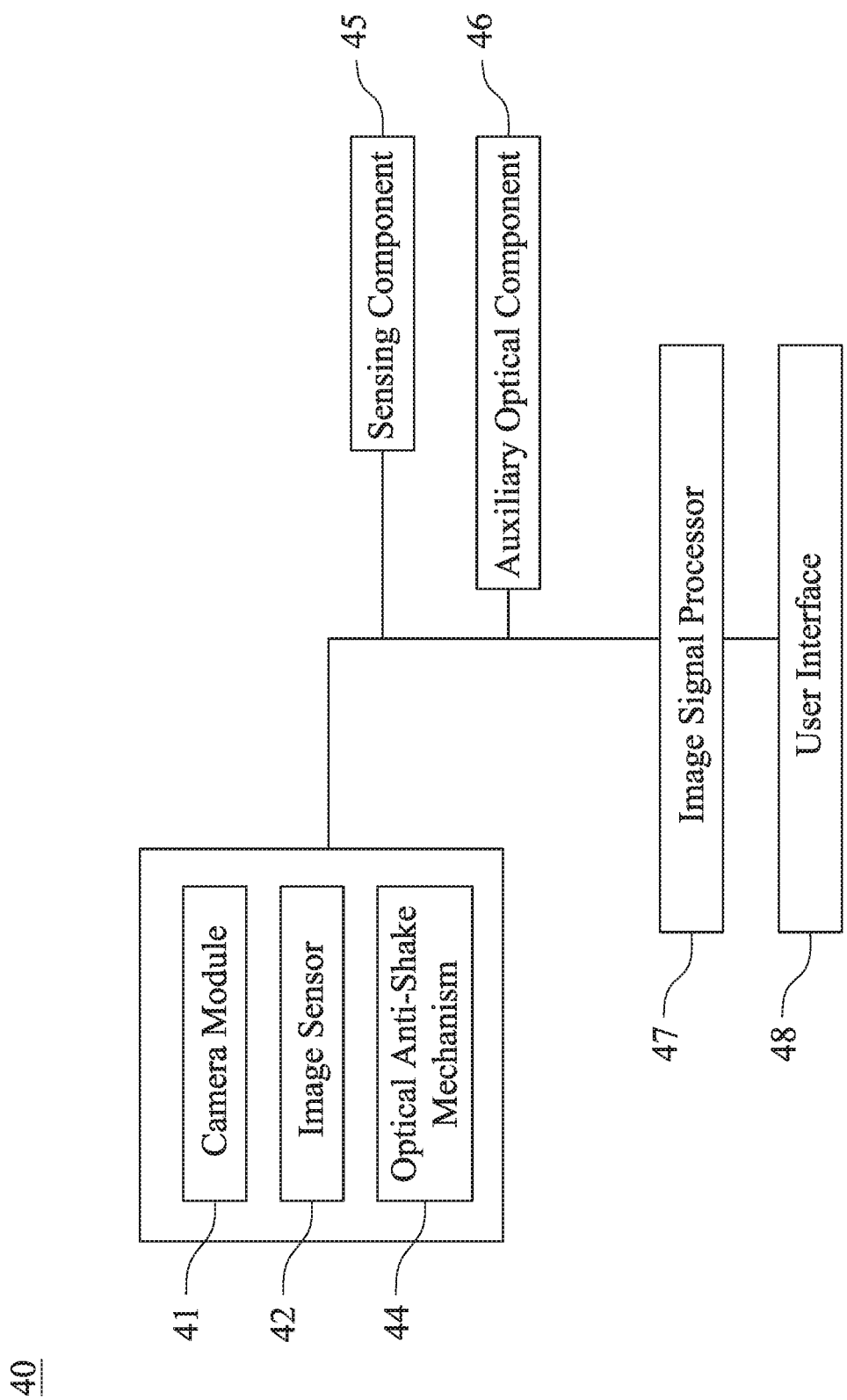
FIG. 4C is a block diagram of the electronic device according to the 4th embodiment.

FIG. 4C is a block diagram of the electronic device 40 according to the 4th embodiment, especially a block diagram of the electronic device 40. In FIG. 4A to FIG. 4C, the electronic device 40 can further include an optical anti-shake mechanism 44, moreover, the electronic device 40 can further include at least one auxiliary optical component 46 and at least one sensing component 45. The auxiliary optical component 46 can be a flash module for compensating color temperature, an infrared distance measurement component, a laser focus module, etc. The sensing component 45 can have functions for sensing physical momentum and kinetic energy, such as an accelerator, a gyroscope, a Hall Effect Element, to sense shaking or jitters applied by hands of the user or external environments. Accordingly, the auto-focusing functions and the optical anti-shake mechanism 44 of the camera module 41 of the electronic device 40 can be enhanced to achieve the superior image quality. Furthermore, the electronic device 40 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 48a and manually operate the view finding range on the touch screen 48a to achieve the autofocus function of what you see is what you get.

Moreover, in FIG. 4B, the camera module 41, the image sensor 42, the optical anti-shake mechanism 44, the sensing component 45, and the auxiliary optical component 46 can be disposed on a flexible printed circuitboard (FPC) 49a and electrically connected with the associated elements, such as an image signal processor 47, via a connector 49b to perform a capturing process. Since the current electronic devices, such as smartphones, have a tendency of being light and thin, the way of firstly disposing the camera module, the imaging lens assembly and related elements on the flexible printed circuitboard and secondly integrating the circuit into the main board of the electronic device via the connector can satisfy the mechanical design of the limited space inside the electronic device and the layout requirements and obtain more margins. The auto focus function of the imaging lens module can be controlled more flexibly via the touch screen of the electronic device. In the 4th embodiment, the electronic device 40 can include a plurality of sensing components 45 and a plurality of auxiliary optical components 46. The sensing components 45 and the auxiliary optical components 46 are disposed on the flexible printed circuitboard 49a and at least one other flexible printed circuitboard (not labelled particularly) and electrically connected with the associated elements, such as an image signal processor 47, via corresponding connectors to perform a capturing process. In other embodiments (not shown), the sensing elements and the auxiliary optical elements can also be disposed on the main board of the electronic device or carrier boards in other forms according to requirements of the mechanical design and the circuit layout.

Furthermore, the electronic device 40 can further include, but not be limited to, a display, a control unit, a storage unit, a random access memory, a read-only memory, or the combination thereof.

5th Embodiment

FIG. 5 shows a schematic view of an electronic device 50 according to the 5th embodiment of the present disclosure. In FIG. 5, the electronic device 50 of the 5th embodiment is a tablet. The electronic device 50 includes a camera module 51 according to the present disclosure and an image sensor (not shown), wherein the image sensor is disposed on the image surface (not shown) of the camera module 51.

6th Embodiment

Figure 6:
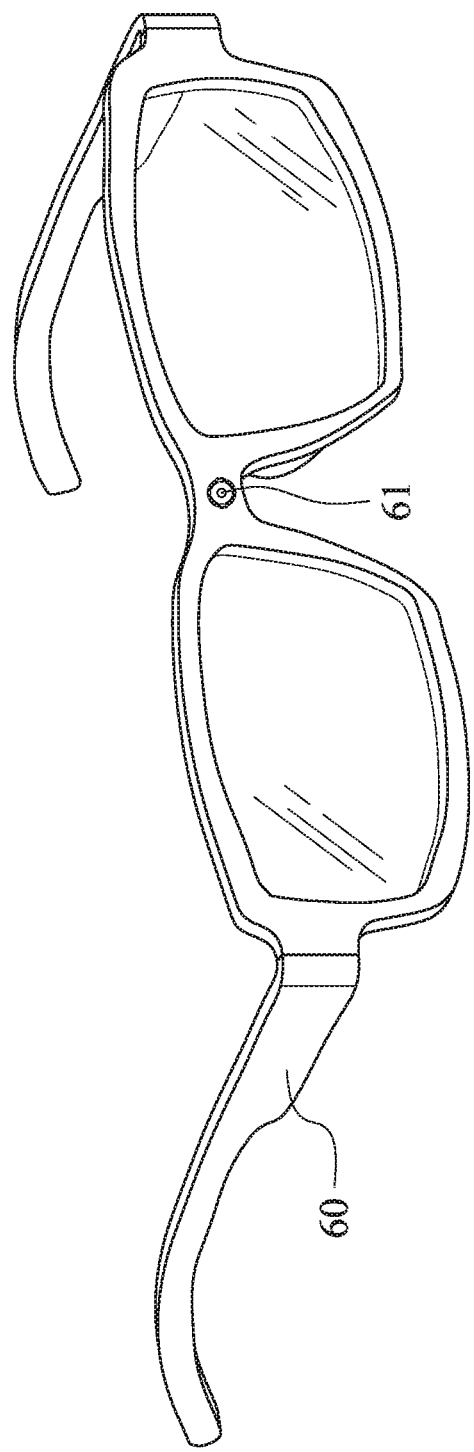
FIG. 6 is a schematic view of an electronic device according to the 6th embodiment of the present disclosure.

FIG. 6 shows a schematic view of an electronic device 60 according to the 6th embodiment of the present disclosure. In FIG. 6, the electronic device 60 of the 6th embodiment is a tablet. The electronic device 60 includes a camera module 61 according to the present disclosure and an image sensor (not shown), wherein the image sensor is disposed on the image surface (not shown) of the camera module 61.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
a plastic carrier, comprising:
an inner portion, wherein an inner space is defined by the inner portion, and the inner portion comprises, from an object side to an image side, an object-side opening, at least one inner annular surface and an image-side opening; and
an outer portion comprising at least one mounting structure;
an imaging lens assembly disposed in the inner space of the plastic carrier, and comprising a plurality of lens elements;
a reflective element for folding an image light by a reflective surface of the reflective element into the imaging lens assembly, wherein the reflective element comprises a first optical axis, the imaging lens assembly comprises a second optical axis, and the first optical axis is folded into the second optical axis via the reflective surface; and
a plurality of auto-focusing elements comprising at least two magnets and at least one wiring element, wherein the auto-focusing elements are for moving the plastic carrier along the second optical axis of the imaging lens assembly, and the at least two magnets or the at least one wiring element are mounted on the at least one mounting structure of the outer portion;
wherein, the object-side opening is closer to the reflective element than the image-side opening thereto, the at least two magnets are respectively disposed on two sides of one plane formed by the first optical axis and the second optical axis; and
wherein the inner portion of the plastic carrier and the at least one mounting structure of the outer portion are integrally formed into a black plastic article via an injection molding, and the plastic carrier further comprises at least two gate traces respectively disposed on the two sides of the plane formed by the first optical axis and the second optical axis.

2. The camera module of claim 1, wherein the at least one wiring element is disposed on the plastic carrier and faces towards the at least two magnets.

3. The camera module of claim 1, wherein the at least two magnets are disposed on the plastic carrier and face towards the wiring element.

4. The camera module of claim 1, wherein one of the lens elements of the imaging lens assembly closest to the reflective element is exposed out of the plastic carrier along a direction vertical to the second optical axis.

5. The camera module of claim 4, wherein the plastic carrier is a threadless structure.

6. The camera module of claim 1, wherein the imaging lens assembly further comprises a retaining ring disposed in the plastic carrier and close to the object-side opening, so as to locate the lens elements in the inner space.

7. The camera module of claim 6, wherein a height of the plastic carrier is H, an outer diameter of the retaining ring is $\psi L$, and the following condition is satisfied:

$$0.3 < \psi L/H < 1.0.$$

8. The camera module of claim 7, wherein the height of the plastic carrier is H, the outer diameter of the retaining ring is $\psi L$, and the following condition is satisfied:

$$0.4 < \psi L/H < 0.85.$$

9. The camera module of claim 1, wherein the auto-focusing elements further comprise a first sheet elastic element and a second sheet elastic element, wherein the first sheet elastic element and the second sheet elastic element are arranged along the second optical axis in pairs.

10. The camera module of claim 1, wherein a number of the at least one inner annular surface is at least three.

11. The camera module of claim 1, wherein a half of a maximum field of view of the imaging lens assembly is HFOV, and the following condition is satisfied:

$$0 \text{ degrees} < HFOV < 20 \text{ degrees}.$$

12. The camera module of claim 1, wherein the reflective element is a prism element and a number of the reflective element is only one, which is for folding the image light into the imaging lens assembly thereby.

13. The camera module of claim 12, wherein one of the lens elements of the imaging lens assembly closest to the prism element is a first lens element, and a central thickness of the first lens element is a largest central thickness among central thicknesses of the lens elements of the imaging lens assembly.

14. The camera module of claim 12, wherein one of the lens elements of the imaging lens assembly closest to the prism element is a first lens element, a distance between an object-side surface of the first lens element and an image surface on the second optical axis is TTL, a focal length of the imaging lens assembly is f, and the following condition is satisfied:

$$0.4 < TTL/f < 1.10.$$

15. The camera module of claim 1, wherein all of the lens elements of the imaging lens assembly are located in the inner space of the plastic carrier.

16. The camera module of claim 1, wherein the at least two gate traces are close to the image-side opening.

17. The camera module of claim 1, wherein a diameter of the image-side opening is smaller than outer diameters of all of the lens elements of the imaging lens assembly.

18. The camera module of claim 1, wherein a number of the at least one wiring element is only one, and the wiring element surrounds the outer portion of the plastic carrier.

19. The camera module of claim 1, wherein a number of the at least two magnets is an even.

20. The camera module of claim 1, wherein a material of the plastic carrier comprises a chemical fiber or a glass fiber.

21. An electronic device, comprising:
    the camera module of claim 1; and
    an image sensor disposed on an image surface of the camera module.

* * * * *